US012718346B2

(12) United States Patent
Shem-Tov et al.

(10) Patent No.: US 12,718,346 B2
(45) Date of Patent: Aug. 25, 2026

(54) PHARMACEUTICAL PREPARATION METHODS AND SYSTEMS USING IMAGING TECHNOLOGIES

(71) Applicant: EQUASHIELD MEDICAL LTD, Migdal Tefen (IL)

(72) Inventors: Eric Shem-Tov, Ramat Hasharon (IL); Mordechay Rozenzon, Kiryat Bialik (IL); Boaz Slav, Haifa (IL); Osnat Perry, Harduf (IL); Yizhaq Cooper, Kiryat Ata (IL); Dor Shichman, Ness Ziona (IL); Jenia Gershtein, Karmiel (IL)

(73) Assignee: EQUASHIELD MEDICAL LTD, Migdal Tefen (IL)

( * ) Notice: Subject to any disclaimer, the term of this patent is extended or adjusted under 35 U.S.C. 154(b) by 0 days.

(21) Appl. No.: 19/184,158

(22) Filed: Apr. 21, 2025

(65) Prior Publication Data

US 2025/0245810 A1 Jul. 31, 2025

Related U.S. Application Data

(63) Continuation of application No. PCT/IL2023/051123, filed on Oct. 31, 2023.

(Continued)

(51) Int. Cl.
*G06T 7/62* (2017.01)
*B25J 9/16* (2006.01)

(Continued)

(52) U.S. Cl.
CPC .......... *G06T 7/0004* (2013.01); *B25J 9/1697* (2013.01); *G06T 1/0014* (2013.01); *G06T 7/62* (2017.01); *G06T 2207/30164* (2013.01)

(58) Field of Classification Search
CPC ....... G06T 7/0004; G06T 1/0014; G06T 7/62; G06T 2207/30164; B25J 9/1697;

(Continued)

(56) References Cited

U.S. PATENT DOCUMENTS

2006/0178578 A1 8/2006 Tribble et al.
2013/0310990 A1* 11/2013 Peret .......................... G06T 7/13 700/282

(Continued)

OTHER PUBLICATIONS

International Search Report from corresponding PCT Application No. PCT/IL2023/051123, Jan. 22, 2024.

(Continued)

*Primary Examiner* — Sheela C Chawan
(74) *Attorney, Agent, or Firm* — WORKMAN NYDEGGER

(57) ABSTRACT

Systems and methods are provided for determining presence of fluid or air in a non-opaque tube in a pharmaceutical preparation device. The system includes a processing circuitry (PC). The PC is configured to: receive a camera image of the non-opaque tube, the non-opaque tube being positioned, from a camera perspective, in front of a patterned background, the received image thereby depicting one or more regions of the non-opaque tube, wherein each region is associated with a respective degree of refraction of the patterned background; and identify, using image processing techniques, in the received image, one or more of the regions of the non-opaque tube; and determine from, at least, one or more of the identified regions, a content characteristic of the non-opaque tube.

11 Claims, 22 Drawing Sheets

Perform segmentation of the image into image regions
910

Optionally: identify an image region including the background pattern
920

Identify one or more regions including refractions of the background pattern
930

For one or more of the identified regions: determine if the degree of refraction of the region meets a refraction criterion, thereby determining the content of the tube corresponding to the region
940

Related U.S. Application Data

(60) Provisional application No. 63/477,314, filed on Dec. 27, 2022, provisional application No. 63/381,630, filed on Oct. 31, 2022.

(51) Int. Cl.
*G06T 1/00* (2006.01)
*G06T 7/00* (2017.01)

(58) Field of Classification Search
CPC .. B65B 3/003; B65B 3/30; A61J 3/002; A61J 2200/74; A61J 2205/10; A61J 2205/30; A61J 2205/70; A61J 1/2096; G01F 22/00; G01F 23/205; G01F 25/0092
USPC .................................................. 382/100, 173
See application file for complete search history.

(56) References Cited

U.S. PATENT DOCUMENTS

| | | | | |
|---|---|---|---|---|
| 2014/0177932 | A1 | 6/2014 | Milne et al. | |
| 2016/0061641 | A1 | 3/2016 | Peret et al. | |
| 2016/0073063 | A1 | 3/2016 | Peret et al. | |
| 2016/0200462 | A1 | 7/2016 | Kriheli et al. | |
| 2018/0061641 | A1* | 3/2018 | Choi | H01L 21/67069 |
| 2018/0108435 | A1* | 4/2018 | Brown | G01F 22/00 |
| 2022/0211954 | A1* | 7/2022 | Cowan | A61M 5/14546 |

OTHER PUBLICATIONS

International Preliminary Report on Patentability from corresponding PCT Application No. PCT/IL2023/051123, Feb. 26, 2025.

* cited by examiner

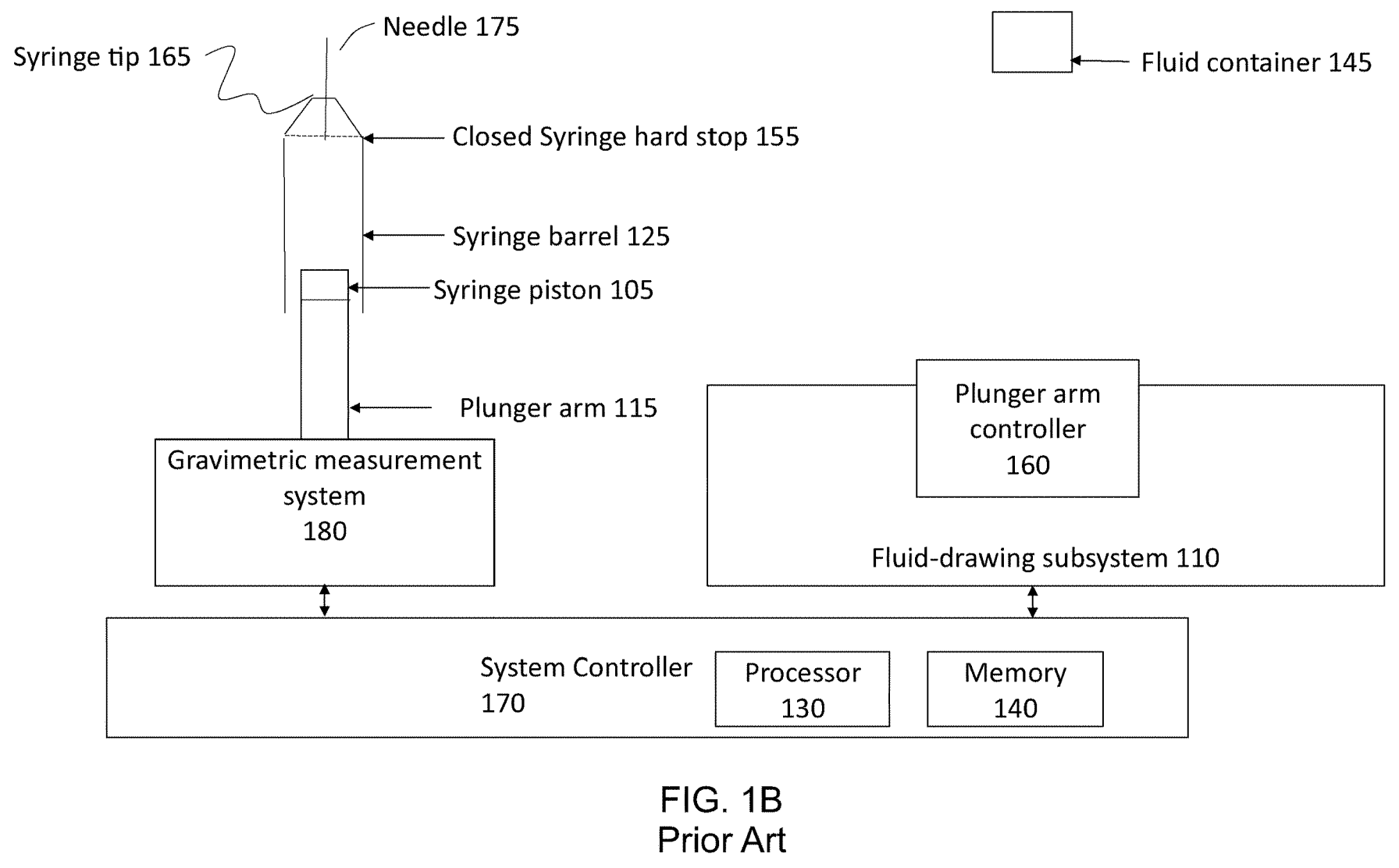

Fluid container 145

Plunger arm controller 160

Fluid-drawing subsystem 110

Memory 140

Processor 130

System Controller 170

Needle 175

Closed Syringe hard stop 155

Syringe barrel 125

Syringe piston 105

Plunger arm 115

Gravimetric measurement system 180

Syringe tip 165

FIG. 1B
Prior Art

PHARMACEUTICAL PREPARATION METHODS AND SYSTEMS USING IMAGING TECHNOLOGIES

TECHNICAL FIELD

The presently disclosed subject matter relates to use of imaging in automation, and in particular to implementation of systems for verification of pharmacy compounding devices (PCD).

BACKGROUND

Problems of implementation in PCDs have been recognized in the conventional art and various techniques have been developed to provide solutions.

SUMMARY

There is provided a system of determining a volume of fluid drawn into a syringe, the system comprising:

- a first processing circuitry operably connectable to a camera that is configurable to photograph a syringe from a first distance,
- the first processing circuitry being configured to:
  - a) receive, from the camera, a digital image of the syringe;
  - b) determine, using image processing, data indicative of a pixel distance, in the obtained digital image, between:
    - a closed syringe hard stop, and
    - a top of a syringe piston inserted to the syringe; and
- a second processing circuitry comprising a processor and memory, and being configured to:
  - a) receive, from a fluid-drawing subsystem configured to withdraw a plunger arm that is inserted into the syringe, a value indicative of a volume of fluid to have been drawn into the syringe; and
  - b) responsive to the calculated fluid volume differing from the fluid volume received from the fluid-drawing subsystem by a value meeting an alerting threshold:
    - raise an alert;
    - thereby providing a non-gravimetric verification of the volume of fluid drawn into the syringe.

According to one aspect of the presently disclosed subject matter there is provided a computer system of determining presence of fluid or air in a non-opaque tube in a pharmaceutical preparation device, the system comprising:

- a processing circuitry (PC), the PC being configured to:
  - a) receive a camera image of the non-opaque tube, the non-opaque tube being positioned, from a camera perspective, in front of a patterned background,
    - the received image thereby depicting one or more regions of the non-opaque tube, wherein each region is associated with a respective degree of refraction of the patterned background; and
  - b) identify, using image processing techniques, in the received image, one or more of the regions of the non-opaque tube; and
  - c) determine from, at least, one or more of the identified regions, a content characteristic of the non-opaque tube.

In addition to the above features, the system according to this aspect of the presently disclosed subject matter can comprise one or more of features (i) to (vi) listed below, in any desired combination or permutation which is technically possible:

- (i) the PC is further configured to perform the determination of the content characteristic based on the degree of refraction associated with the one or more of the identified regions, thereby giving rise to an indication of a type of content present in the non-opaque tube.
- (ii) the PC determines whether the associated degree of refraction of one of the identified regions matches a degree of refraction characteristic of air in the non-opaque tube.
- (iii) the PC determines whether the associated degree of refraction of one of the identified regions matches a degree of refraction characteristic of a liquid in the non-opaque tube.
- (iv) the PC is further configured to: determine a volume of a region of the non-opaque tube, based on pixel dimensions of one of the identified regions of the image.
- (v) the PC is further configured to determine a volume of a gap between regions of the non-opaque tube, in accordance with a pixel distance between a first identified region of the image and a second identified region of the image.
- (vi) the PC is further configured to responsive to a degree of refraction associated with one of the identified regions not matching a degree of refraction of an expected fluid: raising an alert.

According to another aspect of the presently disclosed subject matter there is provided a computer-implemented method of determining presence of liquid or air in a non-opaque tube in a pharmaceutical preparation device, the method comprising:

- a) receiving a camera image of the non-opaque tube, the non-opaque tube being positioned, from a camera perspective, in front of a patterned background,
  - the received image thereby depicting one or more regions of the non-opaque tube, wherein each region is associated with a respective degree of refraction of the patterned background;
- b) identifying, using image processing techniques, in the received image, one or more of the regions of the non-opaque tube; and
- c) determining from, at least, one or more of the identified regions, a content characteristic of the non-opaque tube.

This aspect of the disclosed subject matter can further optionally comprise one or more of features (i) to (vi) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of determining presence of fluid or air in a non-opaque tube in a pharmaceutical preparation device, the method comprising:

- a) receiving a camera image of the non-opaque tube, the non-opaque tube being positioned, from a camera perspective, in front of a patterned background,
  - the received image thereby depicting one or more regions of the non-opaque tube, wherein each region is associated with a respective degree of refraction of the patterned background;

b) identifying, using image processing techniques, in the received image, one or more of the regions of the non-opaque tube; and c) determining from, at least, one or more of the identified regions, a content characteristic of the non-opaque tube.

This aspect of the disclosed subject matter can further optionally comprise one or more of features (i) to (vi) listed above with respect to the system, mutatis mutandis, in any desired combination or permutation which is technically possible.

According to another aspect of the presently disclosed subject matter there is provided a robotic system of drawing a fluid from a fluid container into a syringe, the system comprising a processing circuitry (PC) configured to:

a) control a fluid-drawing subsystem to withdraw a plunger arm of a syringe that is operably connected to a first fluid container, by a withdrawal distance;

b) receive a digital image of the syringe; and c) responsive to detection, using image processing techniques, of a bubble or air gap in the captured digital image:

control the fluid-drawing subsystem to push the plunger arm by a push distance that is in accordance with:

a bubble or air-gap size that is determined based on the captured image.

In addition to the above features, the system according to this aspect of the presently disclosed subject matter can comprise one or more of features (i) to (xii) listed below, in any desired combination or permutation which is technically possible:

(i) the PC is further configured to:

d) subsequent to the control of the fluid-drawing subsystem to push the plunger arm: repeat a)-c) for one or more additional iterations, wherein the control of the fluid-drawing subsystem, at each iteration, withdraws the plunger arm by a respective incremental withdrawal distance, until the plunger arm is withdrawn from the syringe by a full withdrawal distance, wherein the full withdrawal distance is determined based on a required syringe fill volume (ii) the PC is further configured to, d) responsive to an empty fluid container condition, control a container replacement subsystem to replace the first fluid container with a second fluid container; and e) repeat a)-c) for one or more additional iterations, wherein the control of the fluid-drawing subsystem, at each iteration, withdraws the plunger arm by a respective incremental withdrawal distance, until the plunger arm is withdrawn from the syringe by a full withdrawal distance, wherein the full withdrawal distance is determined based on a required syringe fill volume.

(iii) the PC is further configured to:

receive a post-drawing digital image of the syringe;

estimate, from the post-drawing digital image, using image processing techniques, a volume of the fluid; and responsive to the estimated fluid volume differing from the required syringe fill volume by an amount exceeding a fluid volume tolerance:

raising an alert.

(iv) the withdrawal distance is a full withdrawal distance determined based on a required syringe fill volume.

(v) the PC is further configured to control the fluid-drawing subsystem to withdraw the plunger arm by:

controlling an actuator to move the plunger arm by the withdrawal distance.

(vi) the PC is further configured to:

perform the calculation of the push distance based on, at least, a pixel diameter of the bubble or air-gap in the captured digital image.

(vii) the PC is further configured to, responsive to a count of successive detected bubbles or air-gaps meeting a successive detected bubble threshold: reducing a speed of the actuator that moves the plunger arm.

(viii) the PC is further configured to, responsive to a count of successive detected bubbles or air-gaps meeting a successive detected bubble threshold: raising a misconfigured fluid container alert.

(ix) the digital image was captured with the syringe being positioned, from a camera perspective, in front of a patterned background, the received image thereby depicting one or more regions of the syringe, wherein each region is associated with a respective degree of refraction of the patterned background, and the PC is further configured to detect a bubble or air gap in the captured digital image by:

a. identifying, using image processing techniques, in the captured image, one or more of the regions of the syringe; and b. determining based on, at least, one or more of the identified regions, presence of a bubble or airgap in the syringe.

(x) the PC is further configured to perform the determination of the presence of a bubble or airgap based on the degree of refraction associated with the one or more of the identified regions.

(xi) the empty fluid container condition is based on the PC performing image processing of an image of the fluid container (xii) the empty fluid container condition is based on maintenance, by the PC, of a fluid container fill level.

According to another aspect of the presently disclosed subject matter there is provided a computer-implemented method of drawing a fluid from a fluid container into a syringe, the method comprising:

a) controlling a fluid-drawing subsystem to withdraw a plunger arm of a syringe that is operably connected to a first fluid container, by a withdrawal distance;

b) receiving a digital image of the syringe; and c) responsive to detection, using image processing techniques, of a bubble or air gap in the captured digital image:

controlling the fluid-drawing subsystem to push the plunger arm by a push distance that is in accordance with:

a bubble or air-gap size that is determined based on the captured image.

This aspect of the disclosed subject matter can further optionally comprise one or more of features (i) to (xii) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of drawing a fluid from a fluid container into a syringe, the method comprising:

a) controlling a fluid-drawing subsystem to withdraw a plunger arm of a syringe that is operably connected to a first fluid container, by a withdrawal distance;

b) receiving a digital image of the syringe; and c) responsive to detection, using image processing techniques, of a bubble or air gap in the captured digital image:

controlling the fluid-drawing subsystem to push the plunger arm by a push distance that is in accordance with:

a bubble or air-gap size that is determined based on the captured image.

This aspect of the disclosed subject matter can further optionally comprise one or more of features (i) to (xii) listed above with respect to the system, mutatis mutandis, in any desired combination or permutation which is technically possible.

According to one aspect of the presently disclosed subject matter there is provided a computer system of verifying drawing of a required volume of fluid into a syringe, the system comprising a processing circuitry (PC) operably connectable to a plunger holder configured to withdraw a plunger inserted into the syringe, wherein the syringe is operably connected to a fluid container, the PC being configured to:

a) control the plunger holder to withdraw the plunger to a first plunger withdrawal distance, the first plunger withdrawal distance being based on the required volume, thereby moving the plunger holder from a first plunger holder position to a second plunger holder position; and b) receive a digital image of the syringe, captured subsequent to the withdrawing, and determine, using image processing techniques upon the digital image of the syringe, whether a current volume of fluid in the syringe is in accordance with the required fluid volume.

In addition to the above features, the system according to this aspect of the presently disclosed subject matter can comprise one or more of feature (i) listed below:

(i) the PC is further configured to, prior to a):

receive a first digital image, of the plunger holder at the first plunger holder position; and wherein the PC is further configured to, subsequent to b):

responsive to the current volume of fluid in the syringe not being in accordance with the required fluid volume:

a. receive a second digital image, of the plunger holder at the second plunger holder position;

b. determine, using image processing techniques upon the first digital image of the plunger holder and the second digital image of the plunger holder, whether the second position of the plunger holder is in accordance with the first position of the plunger holder and the first plunger withdrawal distance, c. responsive to the second position of the plunger holder being in accordance with the first position of the plunger holder and the first plunger movement distance: raise a misconfigured syringe alert.

According to another aspect of the presently disclosed subject matter there is provided a computer-implemented method of verifying drawing of a required volume of fluid into a syringe, the method comprising:

a) controlling a plunger holder to withdraw a plunger to a first plunger withdrawal distance, the first plunger withdrawal distance being based on a required volume, thereby moving the plunger holder from a first plunger holder position to a second plunger holder position; and b) receiving a digital image of the syringe, captured subsequent to the withdrawing, and determining, using image processing techniques upon the digital image of the syringe, whether a current volume of fluid in the syringe is in accordance with the required fluid volume.

This aspect of the disclosed subject matter can further optionally comprise feature (i) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of verifying drawing of a required volume of fluid into a syringe, the method comprising:

a) controlling a plunger holder to withdraw a plunger to a first plunger withdrawal distance, the first plunger withdrawal distance being based on a required volume, thereby moving the plunger holder from a first plunger holder position to a second plunger holder position; and b) receiving a digital image of the syringe, captured subsequent to the withdrawing, and determining, using image processing techniques upon the digital image of the syringe, whether a current volume of fluid in the syringe is in accordance with the required fluid volume.

This aspect of the disclosed subject matter can further optionally comprise feature (i) listed above with respect to the system, mutatis mutandis, in any desired combination or permutation which is technically possible.

According to one aspect of the presently disclosed subject matter there is provided a computer system of verifying drawing of a required volume of fluid into a syringe, the system comprising a processing circuitry (PC) operably connectable to a plunger holder configured to withdraw a plunger inserted into the syringe, wherein the syringe is operably connected to a fluid container, the PC being configured to:

a) control the plunger holder to push the plunger to a first plunger push distance, the first plunger push distance being based on the required volume, thereby moving the plunger holder from the first plunger holder position to a second plunger holder position; and b) receive a digital image of the syringe, captured subsequent to the pushing of the plunger, and determine, using image processing techniques upon the digital image of the syringe, whether a current volume of fluid in the syringe is in accordance with the required remaining fluid volume.

In addition to the above features, the system according to this aspect of the presently disclosed subject matter can comprise one or more of feature (i) listed below:

(i) the PC is further configured to, prior to a):

receive a first digital image, of the plunger holder at the first plunger holder position; and the PC is further configured to, subsequent to b):

responsive to the current volume of fluid in the syringe not being in accordance with a required remaining fluid volume:

a. receive a second digital image, of the plunger holder at the second plunger holder position;

b. determine, using image processing techniques upon the first digital image of the plunger holder and the second digital image of the plunger holder, whether the second position of the plunger holder is in accordance with the first position of the plunger holder and the first plunger push distance, c. responsive to the second position of the plunger holder being in accordance with the first position of the plunger holder and the first plunger push distance:

raise a misconfigured syringe alert.

According to another aspect of the presently disclosed subject matter there is provided a computer-implemented method of verifying drawing of a required volume of fluid into a syringe, the method comprising:

a) controlling a plunger holder to push a plunger to a first plunger insertion distance, the first plunger insertion distance being based on a required volume, thereby moving the plunger holder from a first plunger holder position to a second plunger holder position; and b) receiving a digital image of the syringe, captured subsequent to the pushing of the plunger, and determine, using image processing techniques upon the digital image of the syringe, whether a current volume of fluid in the syringe is in accordance with the required remaining fluid volume.

This aspect of the disclosed subject matter can further optionally comprise feature (i) listed above with respect to the system.

According to another aspect of the presently disclosed subject matter there is provided a computer program product comprising a computer readable non-transitory storage medium containing program instructions, which program instructions when read by a processor, cause the processing circuitry to perform a method of verifying drawing of a required volume of fluid into a syringe, the method comprising:

a) controlling a plunger holder to push a plunger to a first plunger insertion distance, the first plunger insertion distance being based on a required volume, thereby moving the plunger holder from a first plunger holder position to a second plunger holder position; and b) receiving a digital image of the syringe, captured subsequent to the pushing of the plunger, and determine, using image processing techniques upon the digital image of the syringe, whether a current volume of fluid in the syringe is in accordance with the required remaining fluid volume.

This aspect of the disclosed subject matter can further optionally comprise feature (i) listed above with respect to the system.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 1A-1B illustrate a block diagrams of an example prior art PCD utilizing gravimetric verification of drawn fluid volume;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "determining", "calculating", "receiving", "providing", "obtaining", "detecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1A:
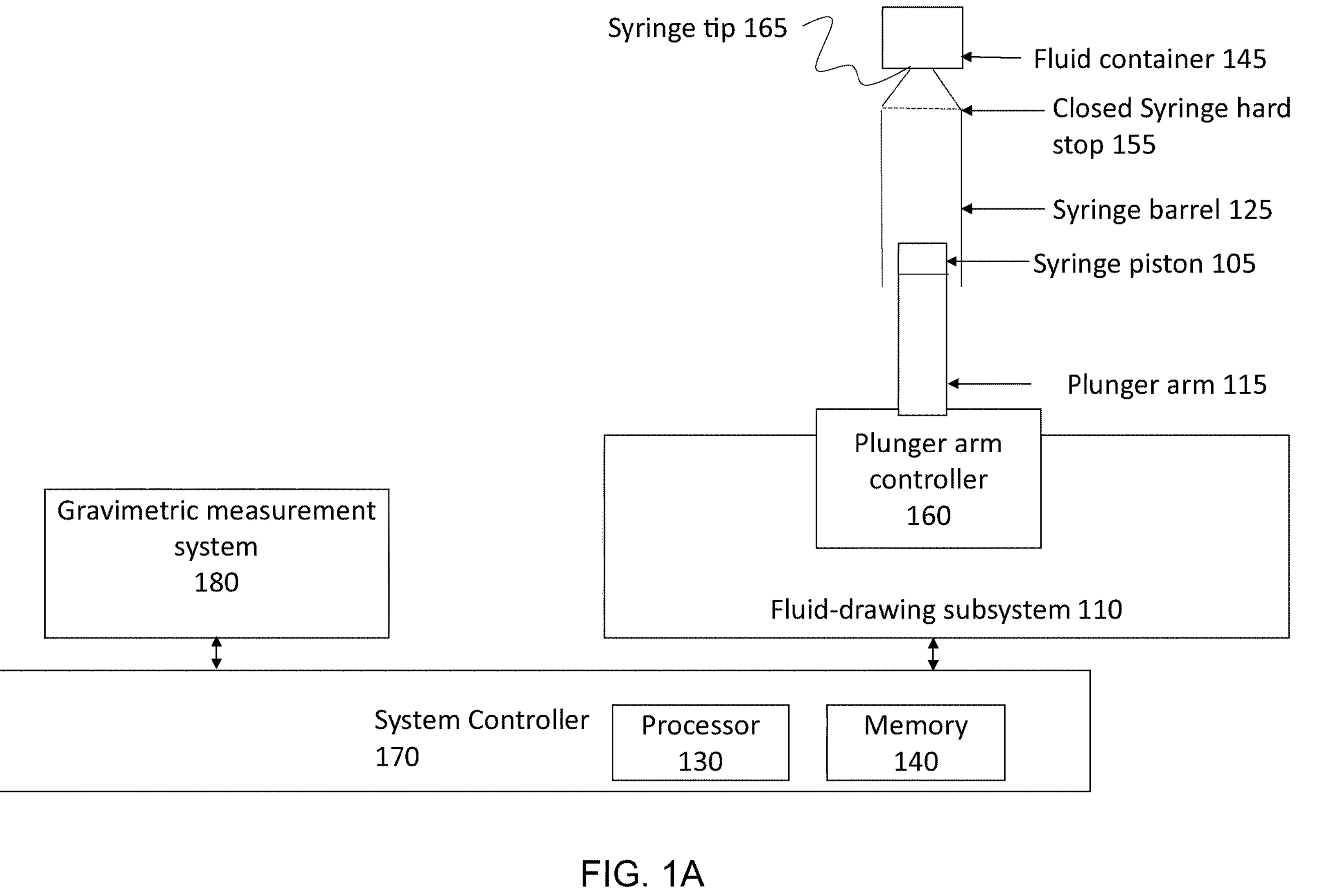

Attention is drawn to FIG. 1A, which illustrates an example prior art filling phase robotic injection preparation system.

Fluid-drawing subsystem 110 can be a subsystem that draws a fluid from fluid container 145 into syringe barrel 125.

Fluid-drawing subsystem 110 can include a processor-based controller (not shown), which can control a mechanical plunger arm controller 160 to withdraw plunger arm 115 from syringe barrel 125, thereby drawing fluid from fluid container 145 into syringe barrel 125.

Syringe tip 165 of syringe 125 can be inserted into fluid container 145 by means of e.g. a needle or other type of connector that penetrates the fluid container. Syringe piston 105 can be inserted into syringe 125. When the syringe piston 105-plunger arm 115 component is fully inserted, syringe piston 105 can be in contact with closed syringe hard stop 155. Plunger arm 115 of syringe piston 105 can be mechanically pulled out from inside syringe 125.

System controller 170 can be a separate controller including a processor 130A and memory 140A. System controller 170 can be operably connected to fluid drawing subsystem 110 (for example: via a bus or a network). System controller 170 can command fluid drawing subsystem 110 to—for example—draw a specific quantity (e.g. volume) of a fluid (such as a medication to be injected into a patient) into syringe 125.

Gravimetric measurement system 180 can be a distinct station within the PCD.

FIG. 1B illustrates the example prior art robotic injection preparation system during a filling accuracy confirmation phase, which can occur subsequent to filling phase.

A mechanism such as a robot arm (not shown) can move syringe 125 from fluid-drawing subsystem 110 to gravimetric measurement system 180. Gravimetric measurement system 180 can include a digital weight scale or other suitable mechanism for measuring the mass of the filled syringe. System controller 170 can be operably connected to gravimetric measurement system 180, and can receive the value of the measured mass of syringe 125. System controller 170 can then raise an alert in a circumstance where the measured mass of filled syringe is not in accordance with a value expected.

Figure 2:
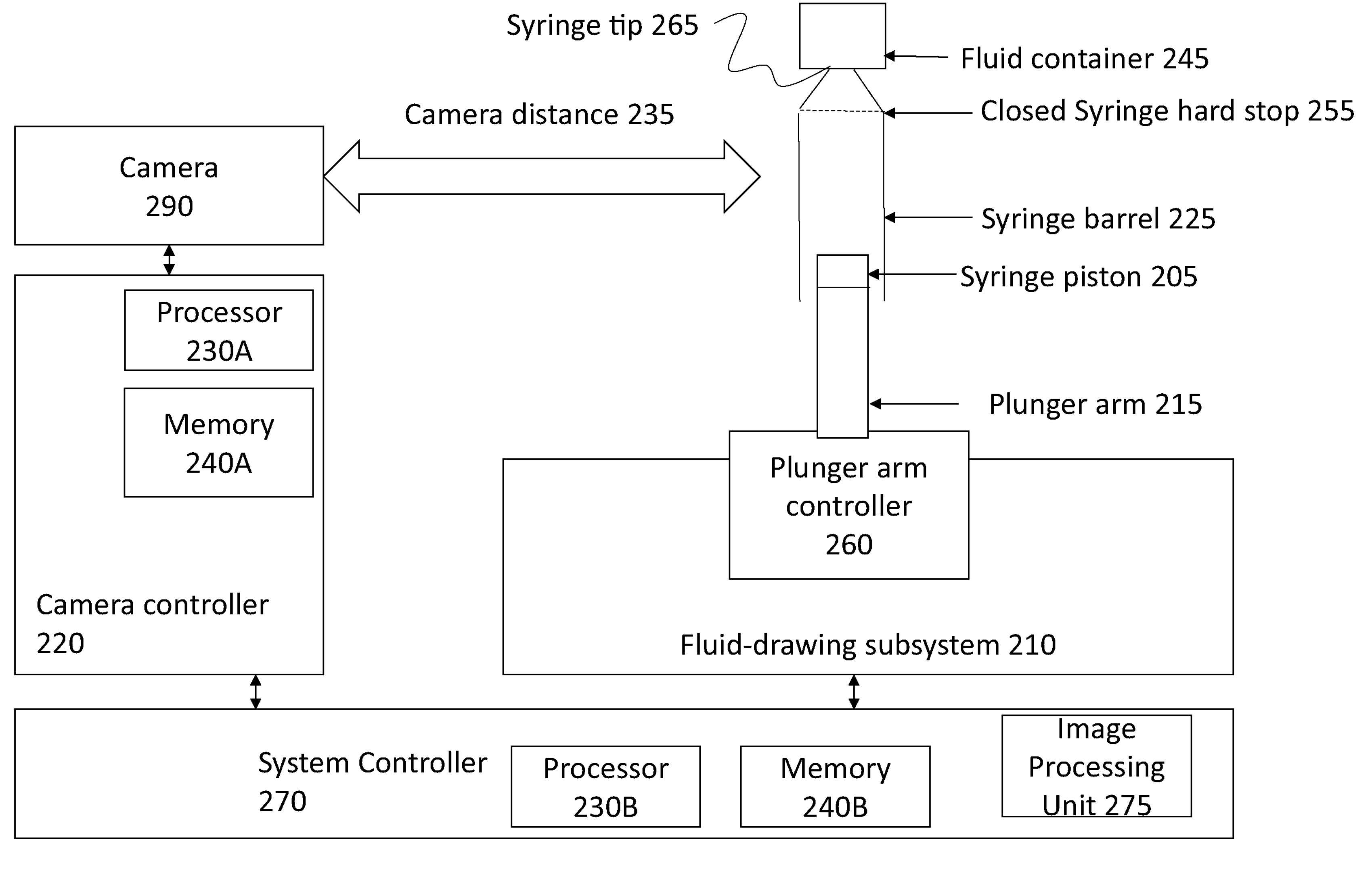
FIG. 2 illustrates a block diagram of an example PCD utilizing imaging-based verification of drawn fluid volume, in accordance with some embodiments of the presently described subject matter.

Attention is drawn to FIG. 2, which illustrates an example robotic pharmaceutical preparation system with optical process monitoring, in accordance with some embodiments of the presently disclosed subject matter.

Fluid-drawing subsystem 210 can be a subsystem that draws a fluid from fluid container 245 into syringe 225. Fluid-drawing subsystem 210 can also inject fluid from syringe 225 into container 245.

Fluid-drawing subsystem 210 can include a processor-based controller (not shown), which can control a mechanical plunger arm controller 260 (also referred to herein as plunger arm holder or plunger holder) to withdraw plunger arm 215 (also referred to herein as plunger) from syringe 225, thereby drawing fluid from fluid container 245 into the body of syringe 225. In some embodiments, plunger arm controller 260 can form a part of a syringe manipulator, where the syringe manipulator is configured to move the syringe (e.g. as a whole) and/or move specific components of the syringe, such as the plunger arm, for example as further described with reference to FIG. 3B below.

Tip 265 of syringe 225 can be inserted into fluid container 245 by means of a needle or another connector that penetrates the container or otherwise fluidly connects the syringe and the container. Syringe piston 205 can be inserted into syringe barrel 225. When the syringe piston 205-plunger arm 215 component is fully inserted, syringe piston 205 can be in contact with closed syringe hard stop 255. Plunger arm 215 of syringe piston 205 can be mechanically pulled out from inside syringe barrel 225.

System controller 270 can be a separate controller including a processor 230B and memory 240B. System controller 270 can be operably connected to fluid drawing subsystem 210 (for example: via a bus or a network). System controller 270 can command fluid drawing subsystem 210 to—for example—draw a specific quantity (e.g. volume) of a fluid (such as a medication to be injected into a patient) into syringe 225.

Camera 290 can be a digital camera configured to optically monitor and control the fluid-drawing performed by fluid-drawing system 210. Camera 290 can be positioned so that it captures a digital image of syringe 225 from a particular distance that is herein termed camera distance 235. Additionally or alternatively, camera 290 can be positioned to capture a digital image of the syringe manipulator (or parts thereof, such as the plunger holder), with or without the syringe. In other words, camera 290 can be configured to image a replaceable (e.g. disposable) component such as the syringe, and/or to image permanent components of the machinery such as the syringe manipulator.

In some embodiments, camera 290 is located in a fixed position relative to syringe 225. In some embodiments, camera 290 can be manually or automatically moved to different positions or distances relative to syringe 225. In some other embodiments the camera position can be fixed, and the syringe can be manually or automatically moved (e.g. by the syringe manipulator) into the field-of-view of camera 290.

Camera controller 220 can be operably connected to camera 290, and can comprise processor 230A and memory 240A. Camera controller can implement camera control methods, and can supply digital images to system controller 270.

System controller 270 can be operably connected to camera 290, and can comprise processor 230B and memory 240B. System controller can implement system control methods such as those described below with reference to FIGS. 4-5. System controller 270 can include processing circuitry (not shown), which in turn can include processor 230B and memory 240B.

Processor 230B can be a suitable hardware-based electronic device with data processing capabilities, such as, for example, a general purpose processor, digital signal processor (DSP), a specialized Application Specific Integrated Circuit (ASIC), one or more cores in a multicore processor, etc. Processor 230B can also consist, for example, of multiple processors, multiple ASICs, virtual processors, combinations thereof etc.

Memory 240B can be, for example, a suitable kind of volatile and/or non-volatile storage, and can include, for example, a single physical memory component or a plurality of physical memory components. Memory 240B can also include virtual memory. Memory 240B can be configured to, for example, store various data used in computation.

Processing circuitry can be configured to execute several functional modules in accordance with computer-readable instructions implemented on a non-transitory computer-readable storage medium. Such functional modules are referred to hereinafter as comprised in the processing circuitry. These modules can include, for example, image processing unit 275.

Figure 3A:
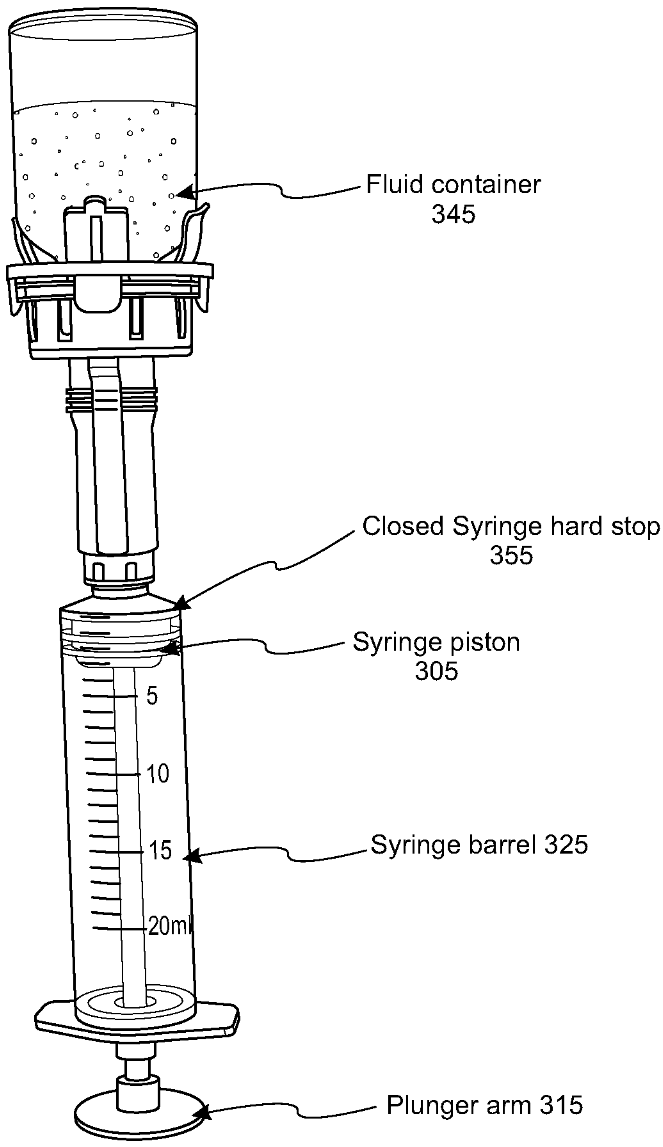
FIG. 3A illustrates an example syringe, fluid container, and associated components, in accordance with some embodiments of the presently described subject matter.

Attention is directed to FIG. 3A which illustrates an example image of a syringe configured for fluid drawing (e.g. by a fluid drawing subsystem), in accordance with some embodiments of the presently disclosed subject matter.

In FIG. 3A, fluid container 345 (245) is visible, as well as syringe components plunger arm 315 (215), syringe piston 305 (205), syringe barrel 325 (255), and closed syringe hard stop 355 (255). The tip of the syringe is inserted to a connector which receives fluid from fluid container 345 (245). Consequently the syringe tip is not visible in the image.

In FIG. 3A, the syringe has not drawn fluid, so syringe piston 305 is in contact with closed syringe hard stop 355.

In some embodiments of the presently disclosed subject matter, system controller 270 processes images the include the fluid container and/or the syringe such as the images shown in FIG. 3A, and determines data indicative of the volume of fluid in the syringe.

Figure 3B:
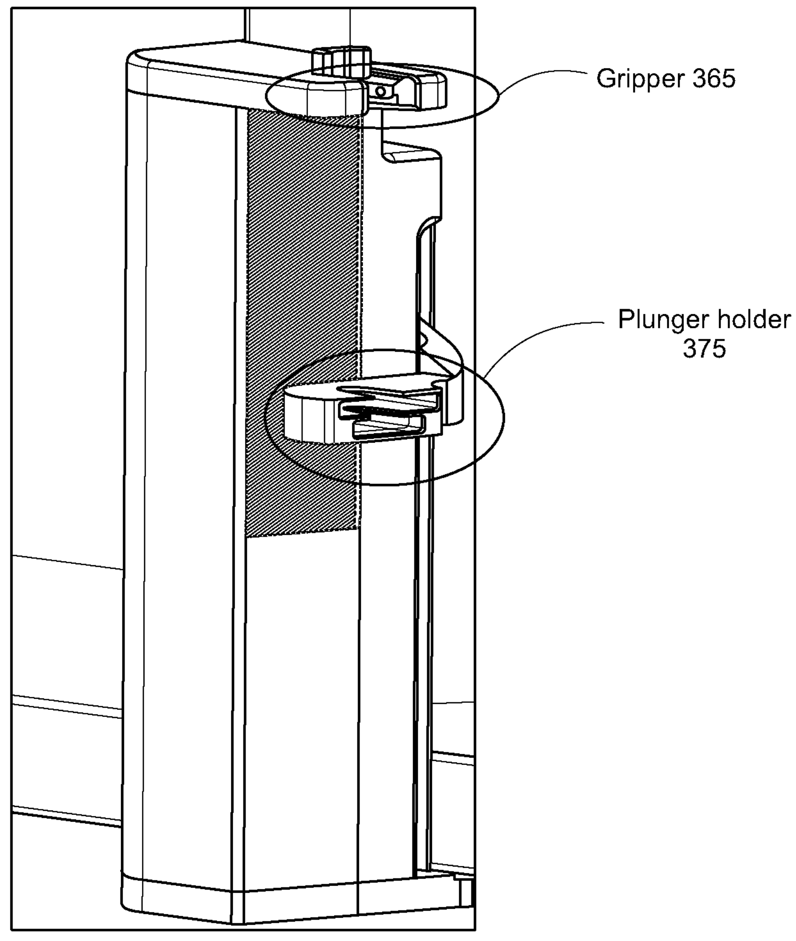
FIG. 3B illustrates an example syringe manipulator, in accordance with some embodiments of the presently described subject matter.

FIG. 3B illustrates an example syringe manipulator, in accordance with some embodiments of the presently disclosed subject matter.

Gripper 365 can be a component of a syringe manipulator which grips e.g. a barrel of a syringe, a hub of a syringe, or a syringe adaptor (connector).

Plunger holder 375 can be a component of a syringe manipulator which grips a plunger arm 315 of a syringe. Plunger holder 375 can be shaped with recess(es), in which a flange of the plunger arm is received.

It is noted that the teachings of the presently disclosed subject matter are not bound by the robotic pharmaceutical preparation system with optical process monitoring and associated components described with reference to FIG. 2, FIG. 3A, and FIG. 3B. Equivalent and/or modified functionality can be consolidated or divided in another manner and can be implemented in any appropriate combination of software with firmware and/or hardware and executed on a suitable device.

Figure 4A:
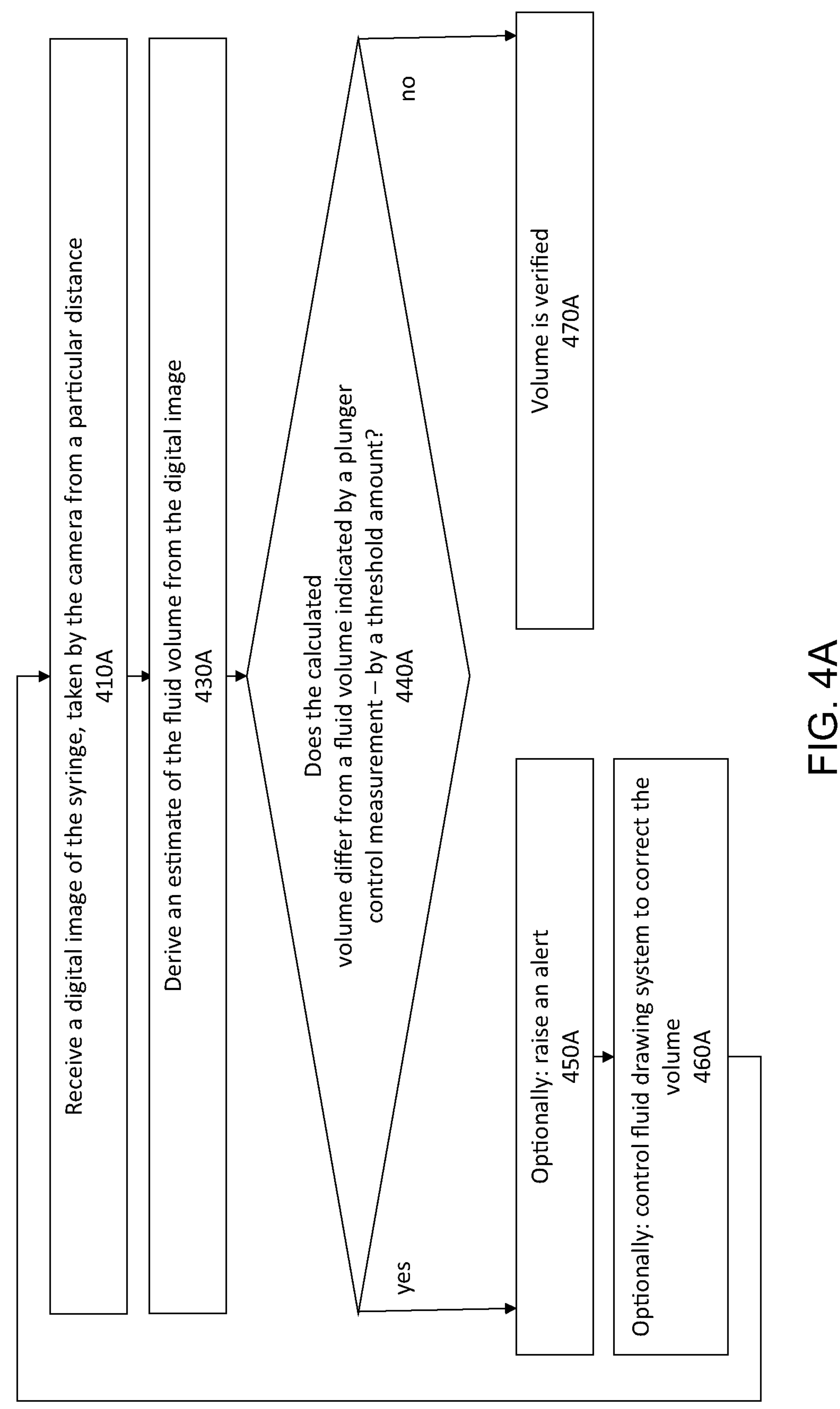
FIG. 4A illustrates a flow diagram of an example method of imaging-based verification of drawn fluid volume by a PCD, in accordance with some embodiments of the presently described subject matter.

Attention is now directed to FIG. 4A, which illustrates an example method of imaging-based confirmation of correctness of robotic fluid draw into a syringe, in accordance with some embodiments of the presently disclosed subject matter.

System controller 270 (for example: image processing unit 275) can receive (410A) a digital image of syringe 225 (e.g. when partially or completely filled with fluid drawn by fluid-drawing subsystem 210). The digital image can be taken by camera 290 and can be taken at camera distance 235 away from syringe 225. In some examples, syringe tip 265 is not visible in the received digital image.

System controller 270 (for example: image processing unit 275) can process (420A) the received digital image to determine the volume of fluid in the syringe.

In some embodiments, system controller 270 (for example: image processing unit 275) compares an image of the syringe with the piston (or plunger arm) in an initial position to an image of the syringe with the piston (or plunger arm) in a subsequent position. System controller 270 can then determine the distance in pixels from the original piston (or plunger arm) position to the subsequent (or plunger arm) piston position.

System controller 270 can then estimate volume by utilizing the determined pixel distance in conjunction with a pixel-to-volume value that is associated with the type of syringe (e.g. the inner barrel diameter of the syringe), the image resolution, and the camera distance 235. In some embodiments, system controller 270 can perform perspective correction before determining the pixel distance. In some embodiments, system controller 270 can perform correction of lens-derived non-linear distortion before determining the pixel distance.

In some embodiments, system controller 270 (for example: image processing unit 275) identifies the position of the piston in the image, and finds the distance (in pixels) from the top of the cylinder to a fixed point.

In some embodiments, system controller 270 (for example: image processing unit 275) identifies a scale line on the syringe to directly determine the volume.

In some embodiments, system controller 270 (for example: image processing unit 275) identifies the position of the syringe handle to determine the extent of its withdrawal.

In some embodiments, system controller 270 (for example: image processing unit 275) utilizes another suitable method to determine the fluid volume.

In some embodiments, system controller 270 determines the pixel-to-volume value in a calibration procedure wherein, for example, system controller 270 receives one or more image of a syringe together with associated volume values as determined e.g., by human input.

The PCD system can utilize system controller 270 and camera controller 220 to perform safety checks on fluid-drawing performed by fluid-drawing subsystem 210. In so doing—in some embodiments—the PCD system can avoid inclusion of a gravimetric measurement system and its associated costs. Furthermore, utilization of imaging-based injection verification can eliminate the need to move the syringe to perform gravimetric measurement and can thus reduce injection preparation time and include throughput of the PCD system.

More specifically: system controller 270 can obtain data indicative of a required injection fluid volume (for example: from a user interface, or from a remote control system). It is recalled that in some embodiments, system controller 270 controls fluid-drawing subsystem 210 to perform the withdrawal of plunger arm 215 and the consequent drawing of the fluid.

If the estimated volume of fluid (i.e. as derived from the image) differs (440A) from the required volume, and if the difference meets a volume error threshold, system controller 270 can then (optionally) raise (450A) an alert (for example: a sound, a message on a control console, a halting of further processing etc.)

In some embodiments, system controller 270 can—instead of, or in addition to raising an alert—control (460A) e.g., the fluid-drawing subsystem 210 to correct the volume, and can then repeat the image-processing-based validation process.

Figure 4B:
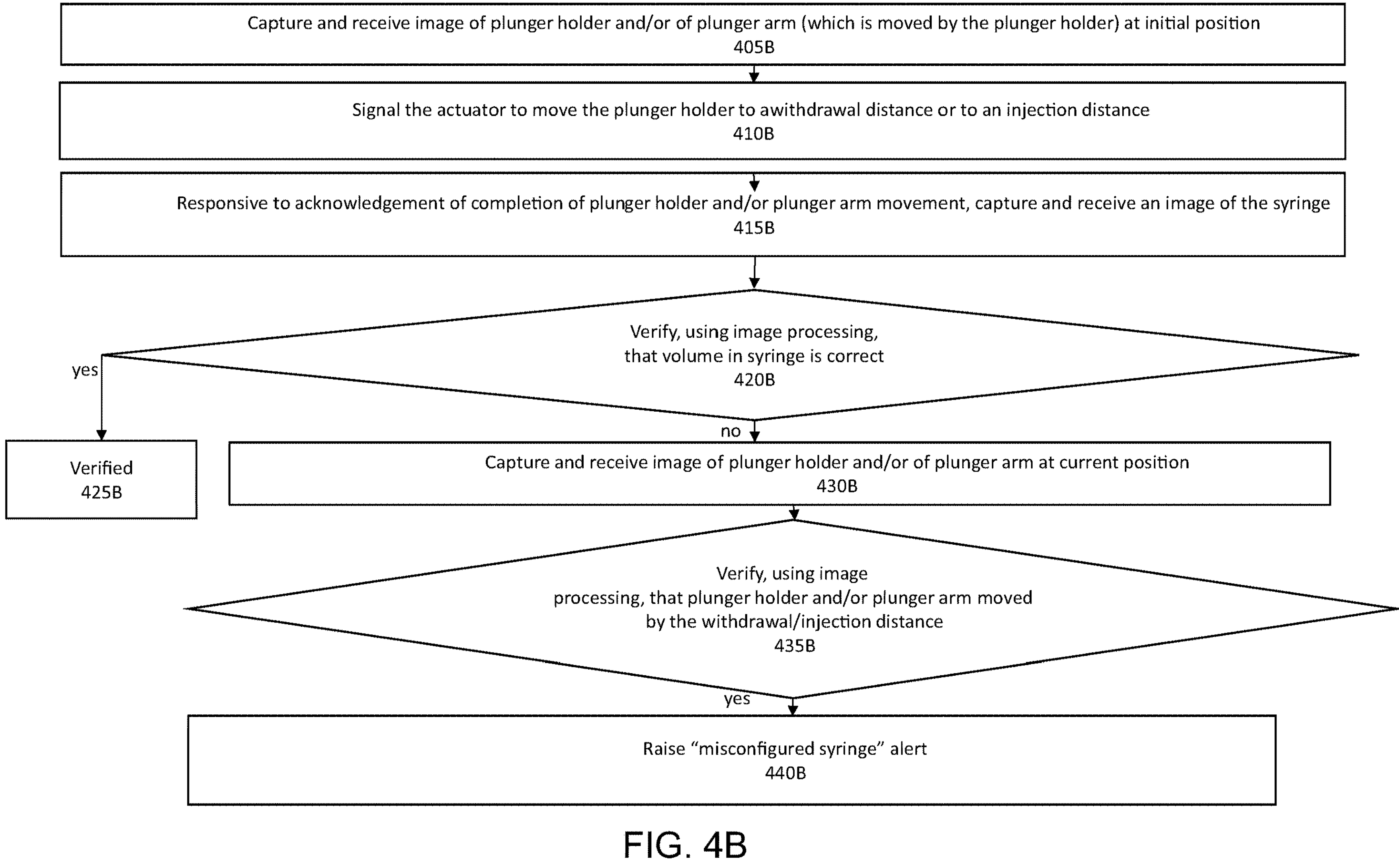
FIG. 4B illustrates a flow diagram of an example method of imaging-based verification of drawn fluid volume and determination of a misconfigured syringe condition by a PCD, in accordance with some embodiments of the presently described subject matter.

Attention is now directed to FIG. 4B, which illustrates another example method of imaging-based confirmation of correctness of robotic syringe operations, in accordance with some embodiments of the presently disclosed subject matter.

The method described in FIG. 4B can be applicable both when drawing fluid into a syringe from an operably connected fluid container (such as a vial or an intravenous bag) and injecting fluid from the syringe into an operably connected fluid container.

System controller 270 (for example: image processing unit 275) can capture and receive (405B) a digital image of plunger holder 375 and/or of a plunger arm held by the holder at an initial position (e.g. before the start of a fluid injection or fluid drawing operation). The digital image can be taken by camera 290 and can be taken at camera distance 235 away from syringe 225. In some examples, syringe tip 265 is not visible in the received digital image.

System controller 270 (for example: image processing unit 275) can next signal 410B fluid drawing system 260 (e.g. an actuator/linear driver (e.g. a servo motor) controlling movement of a syringe manipulator) to move (and thereby move the plunger holder 375 and plunger arm 315) a particular distance. For example: System controller 270 (for example: image processing unit 275) can move plunger holder 375 to move the plunger arm relative to the syringe barrel 325 by a specific plunger withdrawal distance (e.g. so that the required amount of fluid is in the syringe) or to a particular distance into syringe barrel 325 by a particular injection distance (e.g. to inject the entire contents of the syringe into e.g. a vial or intravenous bag).

Responsive to an indication from fluid drawing system 260 (e.g. the driver) that the requested syringe manipulator movement is complete, system controller 270 (for example: image processing unit 275) can next capture and receive (415B) a digital image of syringe 225 and/or of the syringe manipulator or portions thereof. It is noted that other operations can occur between the beginning and completion of the plunger arm movement (e.g. bubble detection and mitigation).

System controller 270 (for example: image processing unit 275) can next verify (420B), using image processing, that volume in syringe is correct (for example: using methods described above, with reference to FIG. 4A).

It is noted that in the case of where the entire contents of a syringe have been injected, the syringe can be expected to be empty e.g. the estimated fluid volume in the syringe is expected to be zero, so that syringe piston 105 is in contact or proximity with closed syringe hard stop 155.

If the volume indicated by image processing is correct e.g. matches (within a threshold) an expected fluid volume which is associated with the amount of movement of the plunger, then the syringe operation is verified (425B).

If the volume indicated by image processing is not correct e.g. differs (by more than a threshold) from an expected fluid volume which is associated with the amount of movement of the plunger, then system controller 270 (for example: image processing unit 275) can next receive (430B) a digital image of plunger holder 375 and/or of the plunger arm at its current position. It is noted that in some examples, this digital image can be the same as the digital image showing the syringe 225 after syringe operation completion described above (i.e. an image captured after syringe draw/syringe injection which depicts both the syringe 225 and the plunger holder 375.

System controller 270 (for example: image processing unit 275) can next e.g. assess the position of the plunger holder and/or of the plunger arm in the first image and the second image, and can verify (435B), using image processing, that the plunger holder and/or plunger arm has moved by the plunger withdrawal distance or plunger injection distance (as appropriate).

If the plunger holder and/or plunger arm has moved by the required amount, then the failure of the drawing or injection can be assumed to be due to a faulty or misconfigured syringe. Accordingly, system controller 270 (for example: image processing unit 275) can raise 440B a "misconfigured syringe" alert.

As referred to herein, a "misconfigured syringe" may refer to: a syringe that is not properly aligned with the fluid container with which transfer of fluid is being performed (e.g. a vial, an IV bag); a syringe that is not properly gripped by the syringe manipulator; a syringe that is not properly connected to the a syringe adaptor; a syringe which is defected or deformed; or any other situation which may interfere with the transfer of fluid to or from the syringe. When a "misconfigured syringe alert" is generated, the situation may be resolved either automatically by the system (in an example, in the case of a misaligned syringe, the system may attempt to reconnect the syringe to the fluid container) or by an operator of the system (in an example, a defected syringe would be replaced by the operator).

Figure 5A:
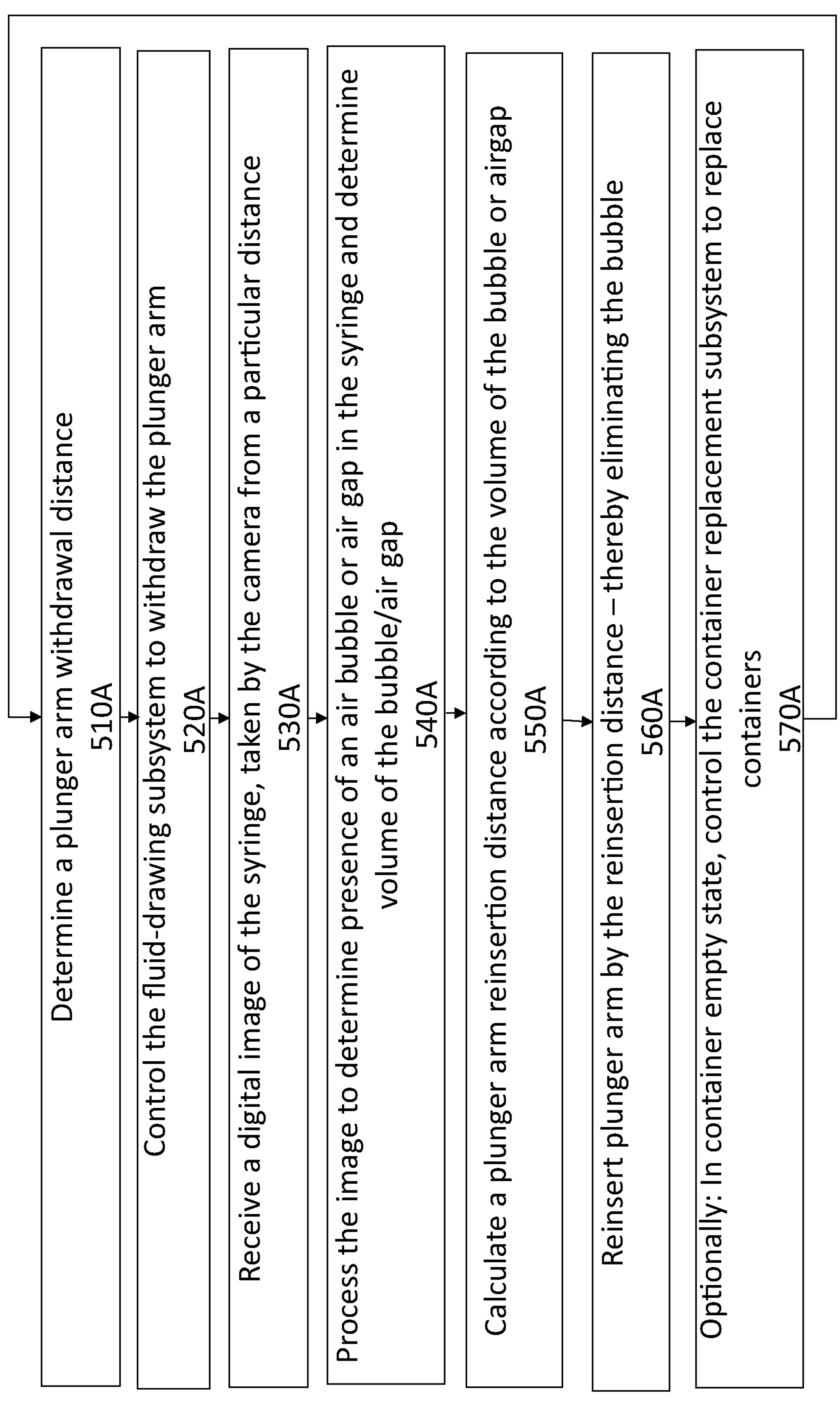
FIG. 5A illustrates a flow diagram of an example method of imaging-based mitigation of a bubble or airgap arising during PCD fluid draw, in accordance with some embodiments of the presently described subject matter

Attention is now directed to FIG. 5A, which illustrates an imaging-based method of eliminating air bubbles (including air bubbles resulting from end-of-container conditions) during robotic injection preparation, in accordance with some embodiments of the presently disclosed subject matter. In some embodiments, the method enables complete consumption of a fluid container during filling of the syringe, and bubble-free completion of the filling from a newly loaded fluid container.

In some embodiments, system controller 270 maintains data that is indicative of the current fluid volume maintained in current fluid container 245 (e.g. vial, IV bag, etc.) from which the fluid-drawing subsystem is drawing. System controller 270 can do this—for example—by receiving data on the volume initially contained in fluid container 245 at the beginning of drawing of fluid from the fluid container 245. System controller 270 can then—for example—update its data indicating the current fluid volume each time it controls the filling of a syringe.

System controller 270 can begin the process by determining (510A) a plunger arm withdrawal distance for the syringe fill.

In some examples, system controller 270 determines this distance in accordance with the required syringe fill volume, so that fluid-drawing system 210 will withdraw plunger arm 215 a distance (e.g. in millimeters) from syringe barrel 225, such that syringe barrel 225 will be filled with the entire volume of fluid (e.g. in milliliters) that is required as part of the injection preparation.

However, if fluid container 245 currently contains less than the required syringe fill volume (a situation herein termed a "container underfill condition"), system controller 270 can utilize a plunger arm withdrawal distance that is in accordance with (e.g. identical to) the volume of fluid that remains in the fluid container. In this case system controller 270 can subsequently control fluid-drawing subsystem 210 to withdraw all the remaining fluid from fluid container 245, resolve the resulting bubble/air gap condition, and then control the fluid-drawing subsystem 210 to replace the vial and complete the syringe fill—as will be described in steps below. Thus, according to this example, the bubble/air gap is used as an indicator for detecting that all volume of fluid that remains in the fluid container has been withdrawn.

System controller 270 can next control (520A) fluid-drawing subsystem 210 to withdraw plunger arm 215 to the determined plunger arm withdrawal distance.

System controller 270 can next receive (530A) a digital image of syringe 225, the image being e.g. a photograph taken by camera 290 at camera distance 235.

System controller 270 can next utilize (540A) image processing methods on the received digital image—to determine whether a bubble or airgap is present in the syringe.

It is noted that in some embodiments, if system controller 270 does not detect an air bubble or air gap upon withdrawing the plunger arm by the plunger arm withdrawal distance that is in accordance with the amount of fluid remaining in fluid container 245, system controller 270 can withdraw the plunger arm by a subsequent withdrawal distance, and again attempt to detect the bubble or air gap.

It is noted that—in the some embodiments (for example: with orientation of syringe 225 being such that syringe tip 265 is pointing upward) a bubble is typically a quasi-spherical region of air within the fluid, while an airgap is typically a fluid-free region adjacent to closed syringe hard stop 255. It is further noted that system controller 270 can utilize appropriate image processing techniques for identifying and analyzing bubbles and/or airgaps.

If a bubble or airgap is in fact present, system controller 270 can estimate the volume of the bubble or air gap in the syringe. If no bubble or airgap is present, the syringe fill operation is complete.

In some cases, presence of a bubble or an airgap may interfere with obtaining the desired volume of fluid, due to the bubble itself occupying a certain volume of the syringe.

System controller 270 can next calculate (550A) a plunger arm reinsertion distance in accordance with the estimated volume of the bubble or airgap. As referred to herein, "reinsertion" and a "reinsertion distance" may refer to the pushing (advancing) of a plunger arm in the direction of a closed syringe hard stop. Optionally, reinsertion is performed after the plunger arm was withdrawn (pulled) away from the closed syringe hard stop.

In some embodiments, system controller 270 determines the plunger arm reinsertion distance from the pixel height of an airgap and a given pixel-to-distance value (i.e. a physical distance—e.g. in millimeters—of a single pixel at the current camera resolution and camera distance 235). In some embodiments, system controller 270 utilizes a plunger arm reinsertion distance that is equal to the product of pixel height and a given pixel-to-distance value in the case of a detected airgap.

In some other embodiments, system controller 270 determines the plunger arm reinsertion distance by first computing an air volume of an airgap from the pixel height and a given pixel-to-volume value (i.e. a volume in the syringe—e.g. in milliliters—associated with a single pixel at the current camera resolution and camera distance 235). In some embodiments, system controller 270 utilizes an air volume that is equal to the product of the pixel height, an inner diameter of syringe 225, and the given pixel-to-distance value). System controller 270 can then determine the reinsertion distance from the estimated volume by utilizing—for example—an inner diameter of syringe 225.

Example methods of receiving and deriving pixel-to-distance and pixel-to-volume values are described hereinabove.

System controller 270 can next reinsert (560A) plunger arm 215 by the determined reinsertion distance, which is sufficient to eliminate the bubble.

It is noted that—in some examples—eliminating the bubble in other ways-such as fully reinserting plunger arm 215 into syringe 225, can lead to syringe breakages.

System controller 270 can, responsive to e.g. earlier detection of a container underfill condition, then control (570A) container replacement subsystem 210 to replace the (now-empty) fluid container 245 with a new full fluid container 245. In some embodiments, the container replacement subsystem can include a robotic arm or other suitable manipulator configured for engaging the empty fluid container, moving the empty container to a designated location (e.g. a disposal tray), engaging a new container (such as from a tray of containers, a conveyor of containers or the like) and bringing the new container into fluid communication with the syringe.

System controller 270 can now return to step 510A, and proceed to complete the syringe fill, and perform another bubble/air gap check.

In some embodiments, system controller 270 maintains a count of successive incidents of detected bubbles in filling the syringe 225. If this count meets given successive detective bubble threshold, system controller 270 can raise a misconfigured fluid container alert (for example: on a console, or using a particular sound etc.) to signal that there may be a misconfiguration causing air to be admitted into the syringe.

It is noted that performing the final draw from old fluid container 245 and the first fluid draw from new fluid container 245 in the manner described hereinabove (i.e. drawing air and eliminating it before switching fluid containers) both prevents waste and reduces potential for spillage.

Figure 5B:
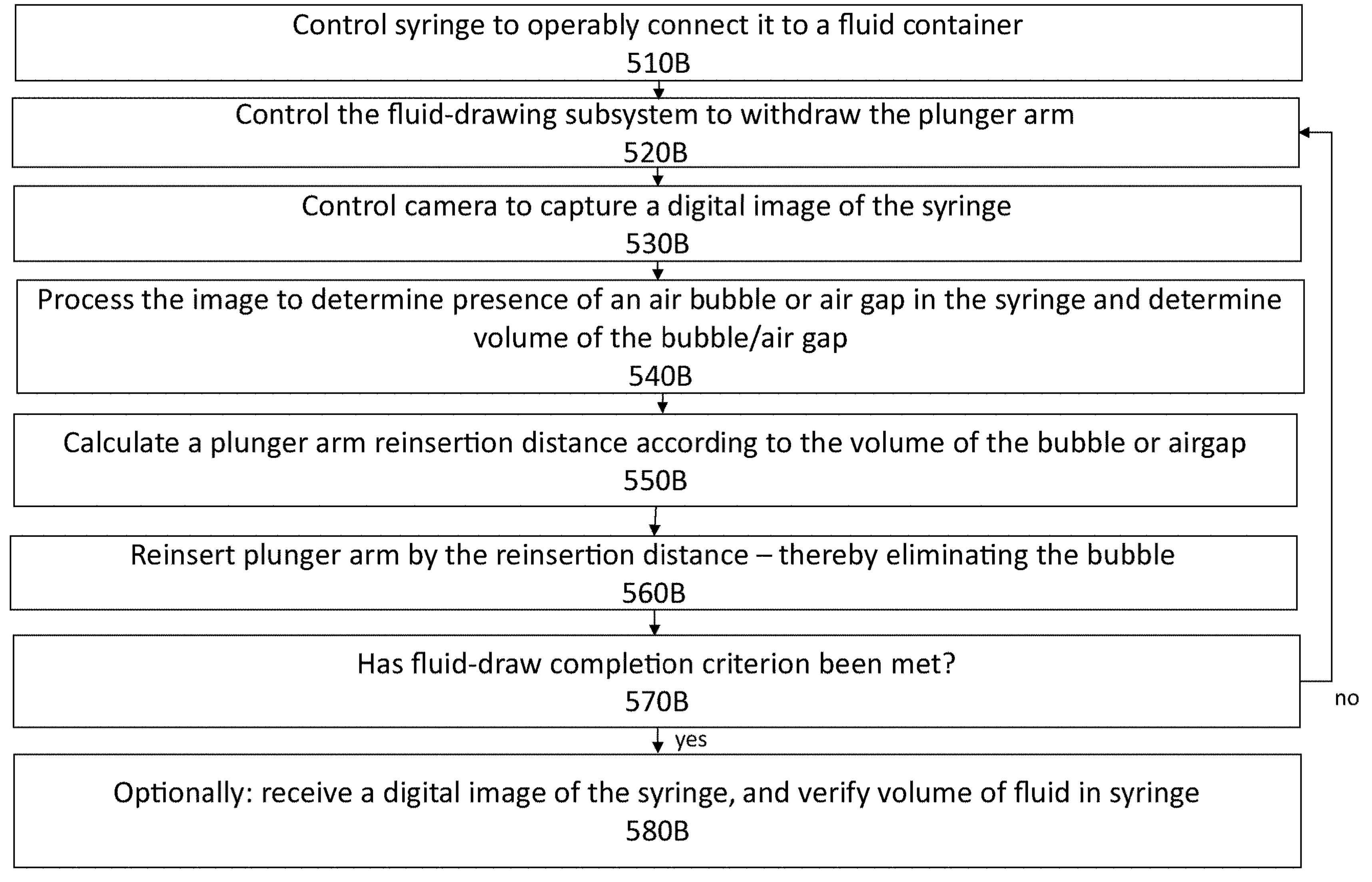
FIG. 5B illustrates a flow diagram of an example method of imaging-based mitigation of a bubble or airgap arising during PCD fluid draw, in accordance with some embodiments of the presently described subject matter.

Attention is now directed to FIG. 5B, which illustrates an imaging-based method of eliminating air bubbles (including air bubbles resulting from end-of-container conditions) during robotic injection preparation, in accordance with some embodiments of the presently disclosed subject matter.

In some embodiments, the method enables complete consumption of a fluid container during filling of the syringe, thereby increasing efficiency while reducing waste, maintenance, and potential operator exposure to dangerous substances. In some embodiments, the method further enables bubble-free completion of the filling from a newly loaded fluid container.

In some embodiments, system controller 270 maintains—on an ongoing basis-data that is indicative of the current fluid volume maintained in current fluid container 245 (e.g. vial, intravenous (IV) bag, etc.) from which the fluid-drawing subsystem is drawing. System controller 270 can do this—for example—by receiving data on the volume initially contained in fluid container 245 at the beginning of drawing of fluid from the fluid container 245. System controller 270 can then—for example—update its data indicating the current fluid volume each time it controls the filling of a syringe.

In some embodiments, camera 290 (or a different camera that it is not shown) can capture images depicting fluid container 245. In some such embodiments, system controller 270 can perform image processing on these captured images to determine whether fluid container 245 is empty, or to determine the quantity of fluid remaining in fluid container 245.

System controller 270 can begin the process by controlling (510B) fluid-drawing subsystem 210 to operably connect a syringe (e.g. syringe tip 265) to a fluid container 245 (for example: by way of a vial adaptor).

System controller 270 can next control (520B) fluid-drawing subsystem 210 to withdraw the plunger arm 215 that is inserted to syringe barrel 225.

In some examples, system controller 270 determines the distance to withdraw plunger arm 215 based on the required syringe fill volume, so that fluid-drawing system 210 will withdraw plunger arm 215 a distance (e.g. in millimeters) from closed syringe hard stop 255, such that—on completion of withdrawal—syringe barrel 225 will be filled with the entire volume of fluid (e.g. in milliliters) that is required as part of the injection preparation.

To improve system efficiency (for example), system controller 270 can utilize a plunger arm withdrawal distance that is less than a distance required to draw the required syringe fill volume or to empty fluid container 245. Specifically system controller 270 can sequentially draw fluid by amounts that are less than the required or available amount, and then capture an image to evaluate if a bubble or air gap condition has occurred. In this manner, system speed is improved, as the bubble or air-gap is detected and mitigated earlier.

It is noted that in some such examples, the image capture and bubble evaluation can take place while the fluid drawing continues. In such cases, the bubble mitigation procedure accounts for motion of plunger arm 215 which took place subsequent to image capture, as described below.

System controller 270 can next receive (530B) a digital image of syringe 225, the image being e.g., a photograph taken by camera 290 at camera distance 235 after fluid-drawing subsystem 210 has withdrawn plunger arm 215 to the withdrawal distance.

System controller 270 can next utilize image processing methods on the received digital image—to determine (540B) whether a bubble or airgap is present in the syringe.

It is noted that—in some embodiments (for example: with orientation of syringe 225 being such that syringe tip 265 is pointing upward) a bubble is typically a quasi-spherical region of air within the fluid, while an airgap is typically a fluid-free region adjacent to closed syringe hard stop 255. It is further noted that system controller 270 can utilize appropriate image processing techniques for identifying and assessing bubbles and/or airgaps.

In some embodiments, the image is captured in front of a patterned background, thereby giving rise to different regions of the syringe image showing the patterned background with different refraction indexes. In such embodiments, image processing methods based on identifying refracted regions can be employed, as will be described below.

If a bubble or airgap is in fact present, system controller 270 can estimate the volume of the bubble or air gap in the syringe (for example: using image processing methods based on identifying refracted regions as described below, or machine-learning classification, or other image processing methods). If no bubble or airgap is present, the syringe fill operation is complete, and system controller 270 can perform imaging-based verification of the fluid volume in the syringe, as described in step 580B below.

System controller 270 can next calculate (550B) a plunger arm reinsertion distance in accordance with the estimated volume of the bubble or airgap.

In some embodiments, system controller 270 determines the plunger arm reinsertion distance from the pixel height of an airgap and a given pixel-to-distance value (i.e. a physical distance—e.g. in millimeters—of a single pixel at the current camera resolution and camera distance 235). In some embodiments, system controller 270 utilizes a plunger arm reinsertion distance that is equal to the product of pixel height and a given pixel-to-distance value in the case of a detected airgap.

In some other embodiments, system controller 270 determines the plunger arm reinsertion distance by first computing an air volume of an airgap from the pixel height and a given pixel-to-volume value (i.e. a volume in the syringe—e.g. in milliliters—associated with a single pixel at the current camera resolution and camera distance 235). In some embodiments, system controller 270 utilizes an air volume that is equal to the product of the pixel height, an inner diameter of syringe 225, and the given pixel-to-distance value). System controller 270 can then determine the reinsertion distance from the estimated volume by utilizing—for example—an inner diameter of syringe 225.

Example methods of receiving and deriving pixel-to-distance and pixel-to-volume values are described hereinabove with reference to FIG. 4A.

In some other embodiments, system controller 270 determines the plunger arm reinsertion distance by utilizing machine learning classification of the image of the syringe. In some such embodiments, system controller 270 determines the plunger arm reinsertion distance without first determining a volume of the bubble or airgap.

In some other embodiments, system controller 270 determines the plunger arm reinsertion distance by another suitable method.

System controller 270 can next reinsert (560B) plunger arm 215 by the determined reinsertion distance, thereby eliminating the bubble or air-gap.

It is noted that—in some examples—eliminating the bubble in other ways-such as fully reinserting plunger arm 215 into syringe 225, can lead to syringe breakages.

In some embodiments, system controller 270 can, responsive to detection of an empty container condition, control a container replacement subsystem (not shown) to replace (now-empty) fluid container 245 with a new full fluid container 245. It is noted that by drawing and mitigating the bubble/air gap, the full quantity of fluid in the vial is utilized, thereby increasing efficiency as well as reducing maintenance and possible exposure of the operator to dangerous chemicals.

In some embodiments, system controller 270 maintains a count of successive incidents of detected bubbles in filling the syringe 225.

In some embodiments, if this count meets a given successive detected bubble threshold, system controller 270 can raise a misconfigured fluid container alert (for example: on a console, or using a particular sound etc.) to signal that there may be a misconfiguration causing air to be admitted into the syringe.

In some embodiments, if this count meets a given successive detected bubble threshold, system controller 270 can modify parameters of the fluid-drawing performed by the fluid-drawing subsystem. For example, in response to bubble detection, system controller 270 can reduce the speed of the fluid draw and/or motor power.

System controller 270 can next evaluate whether a fluid drawing completion criterion (570B) has been met. If the fluid drawing completion criterion has not been met, system controller 270 can return to step 520B, and proceed to complete the syringe fill, and perform another bubble/air gap check. In some embodiments, the fluid drawing completion criterion is whether the plunger arm 215 has been withdrawn to the full withdrawal distance i.e. a distance (e.g. in millimeters) from closed syringe hard stop 255, such that—on completion of withdrawal—syringe barrel 225 will be filled with the entire volume of fluid (e.g. in milliliters) that is required as part of the injection preparation.

If fluid-draw completion criterion has been met, system controller 270 can receive a digital image of the syringe, and verify (580B) volume of fluid in syringe, e.g. as described above with reference to FIGS. 4A-4B.

Figure 5C:
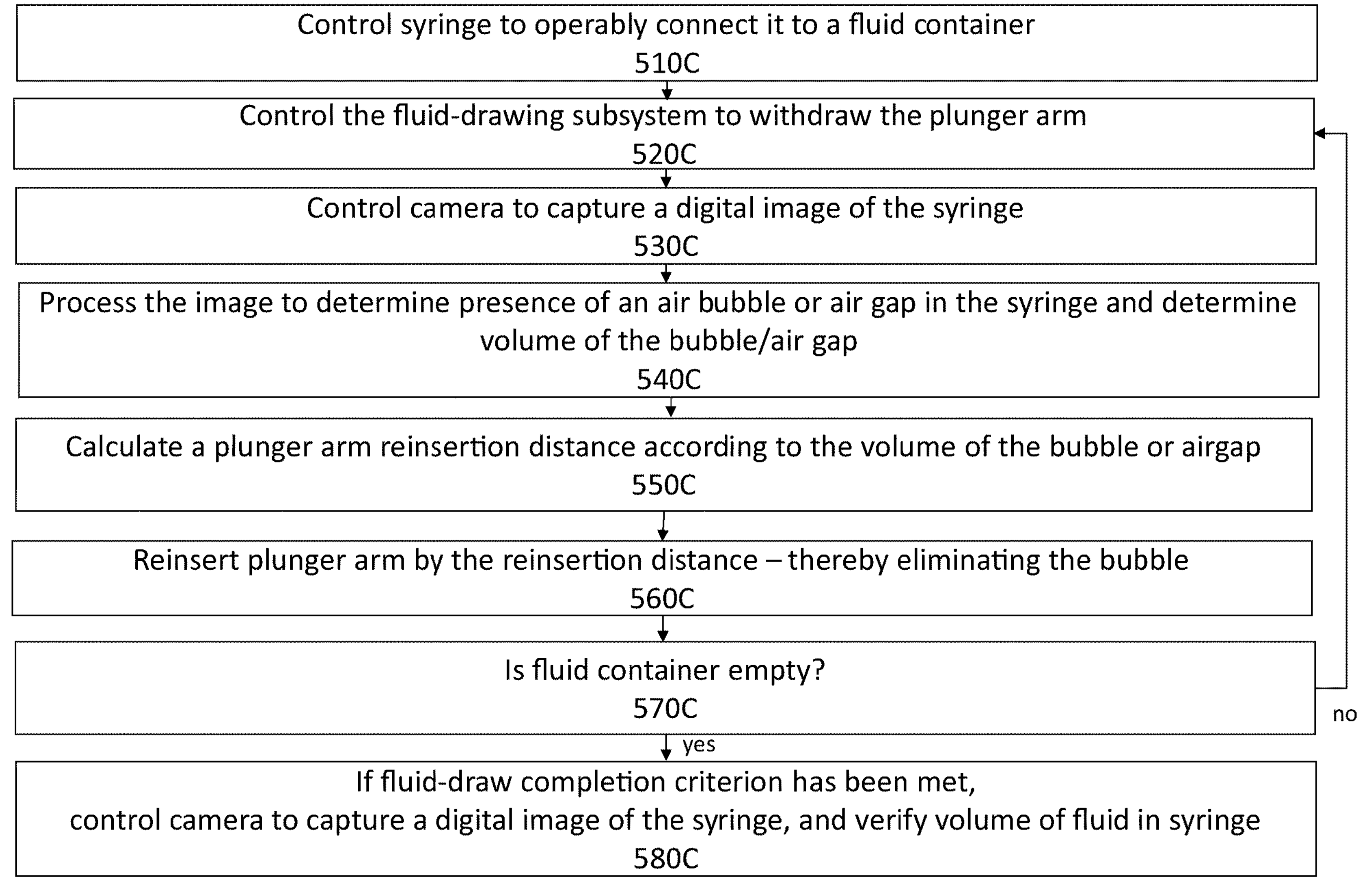
FIG. 5C illustrates a flow diagram of an alternative example method of imaging-based mitigation of a bubble or airgap arising during PCD fluid draw, in accordance with some embodiments of the presently described subject matter.

FIG. 5C illustrates a variation of an imaging-based method of eliminating air bubbles (including air bubbles resulting from end-of-container conditions) during robotic injection preparation, in accordance with some embodiments of the presently disclosed subject matter.

The method of FIG. 5C can be suitable in examples where contents of the vial are known beforehand to be equal to the required syringe fill volume.

Similarly, the method of FIG. 5C can be suitable in examples where contents of the vial are known beforehand to be substantially equal (that is to say: equal within a tolerance value) to the required syringe fill volume.

In the method of FIG. 5C, system controller 270 halts the fluid draw responsive to an empty fluid container condition (570C) (e.g. as detected from an image of the fluid container 245, or from ongoing maintenance of the current volume of fluid container 245.

In this manner, the method ensures that all of the contents of fluid container 245 are utilized, thereby improving efficiency while easing maintenance, and preventing exposing the operator to dangerous substances.

It is noted that the teachings of the presently disclosed subject matter are not bound by the flow charts illustrated in FIGS. 4A, 4B, 5A, 5B, and 5C. The illustrated operations can occur out of the illustrated order. For example, operations 520B and 530B, shown in succession, can be executed substantially concurrently, or in the reverse order. It is also noted that whilst the flow chart is described with reference to elements of the system of FIG. 2, this is by no means binding, and the operations can be performed by elements other than those described herein.

Figure 6A:
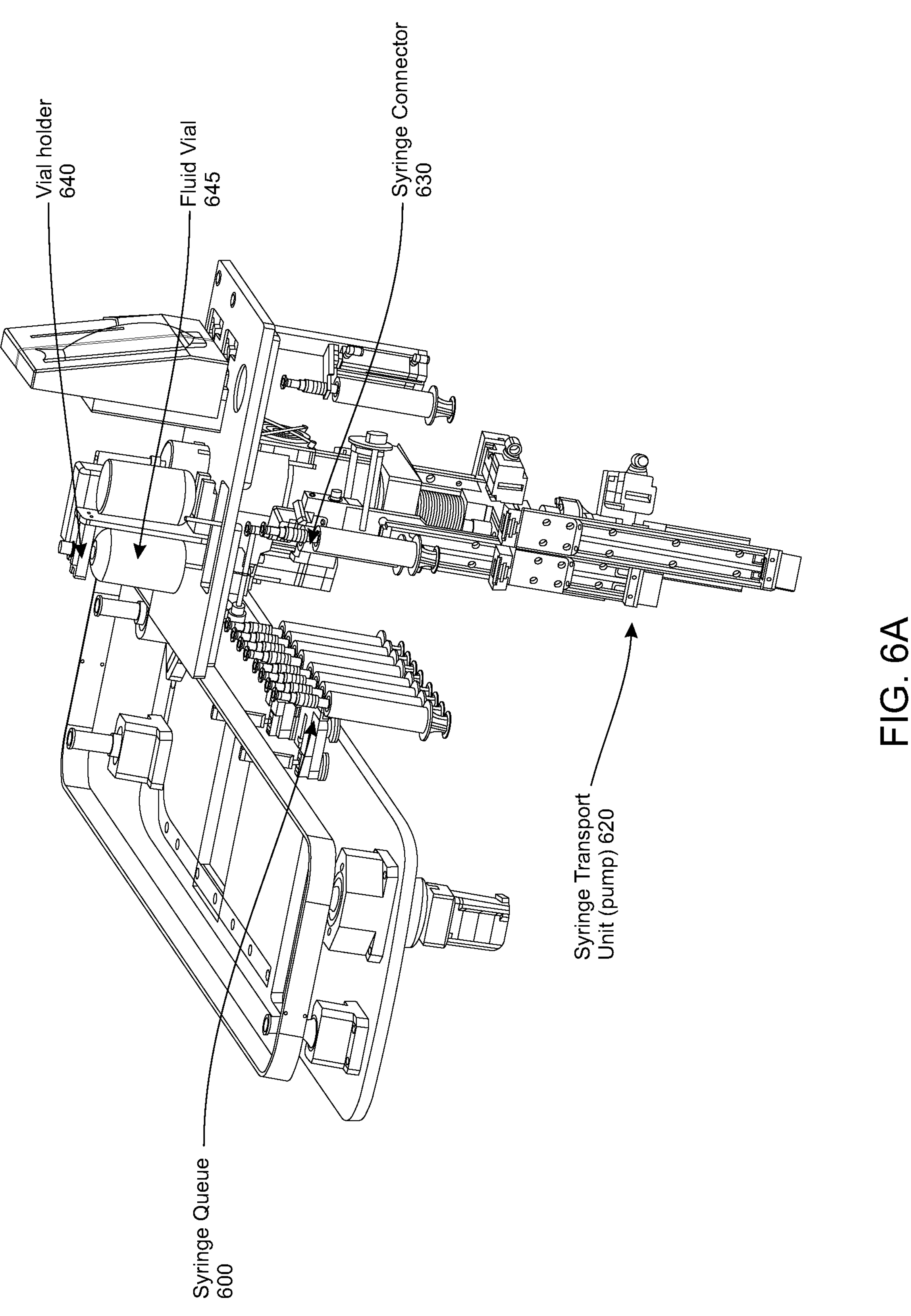
FIG. 6A illustrates an example pharmaceutical compounding device (PCD), in accordance with some embodiments of the presently disclosed subject matter.

Attention is now directed to FIG. 6A, which illustrates an example pharmaceutical compounding device (PCD), in accordance with some embodiments of the presently disclosed subject matter.

The PCD can include vial holder 640, which holds fluid vial 645, which holds fluid to be drawn into a syringe.

The PCD can include a syringe queue 600 including syringes available for use by the PCD The PCD can include a syringe transport unit 620 (also called a pump) that transports syringes.

Figure 6B:
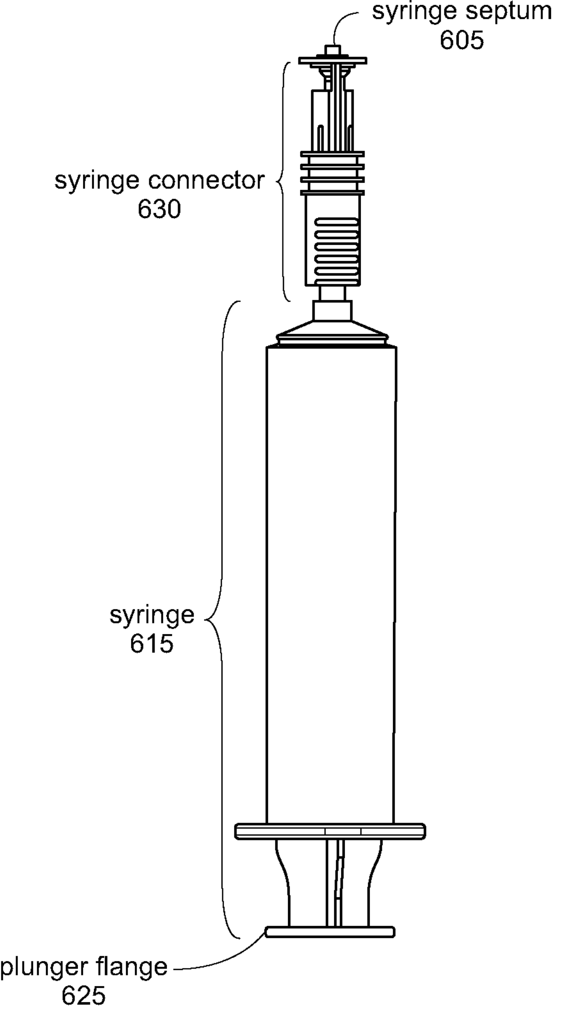
FIG. 6B illustrates an example syringe assembly, in accordance with some embodiments of the presently disclosed subject matter.

FIG. 6B illustrates an example syringe assembly, including a connector, septum, and plunger flange.

Figure 6C:
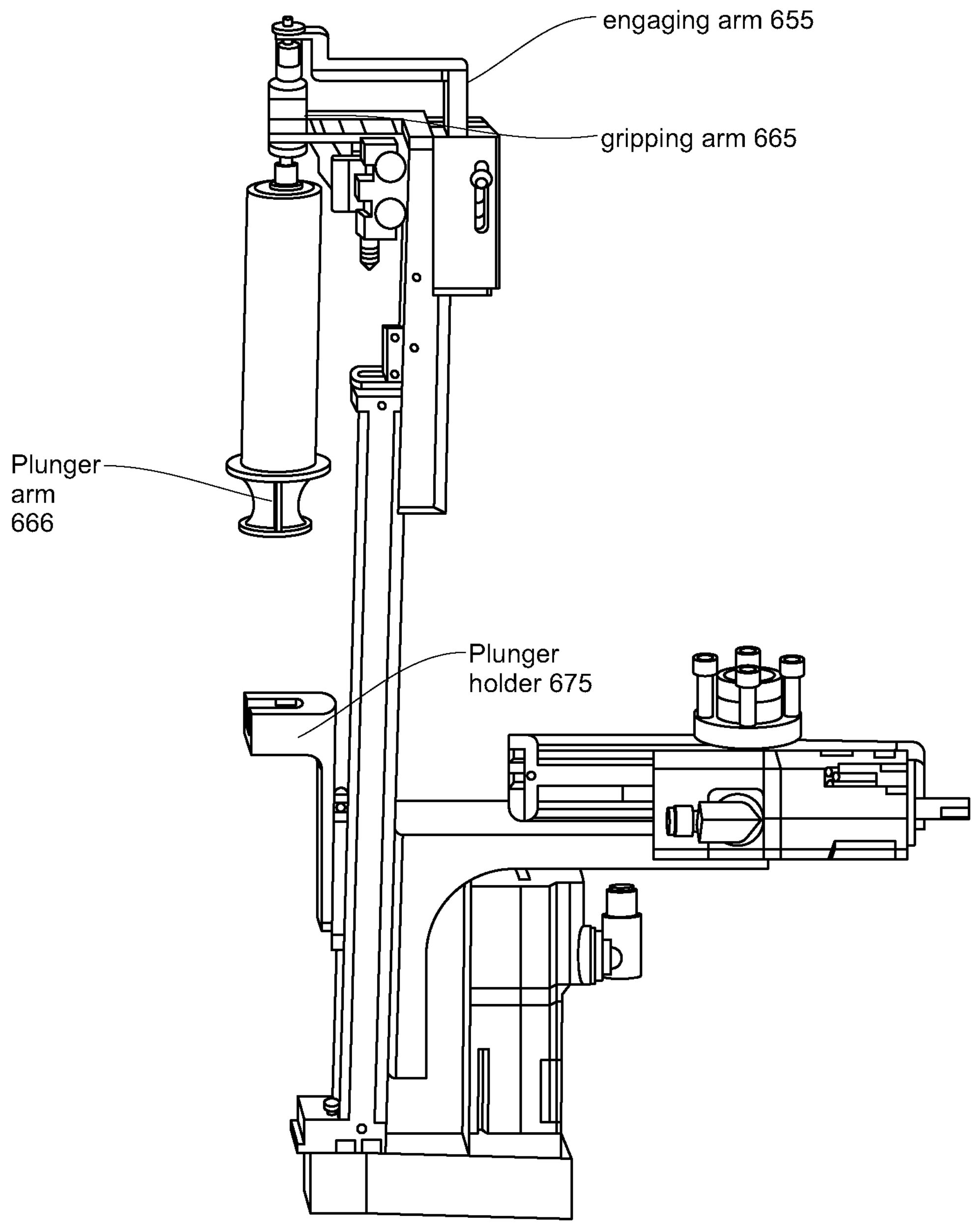
FIG. 6C illustrates an example of a syringe manipulator which comprises an engaging arm 655, a gripping arm 665, and a plunger holder 675 which is configured to engage a plunger arm 666 of a syringe, in accordance with some embodiments of the presently disclosed subject matter.

FIG. 6C illustrates an example engaging arm, example gripping arm, and example plunger arm of a PCD.

Figure 6D:
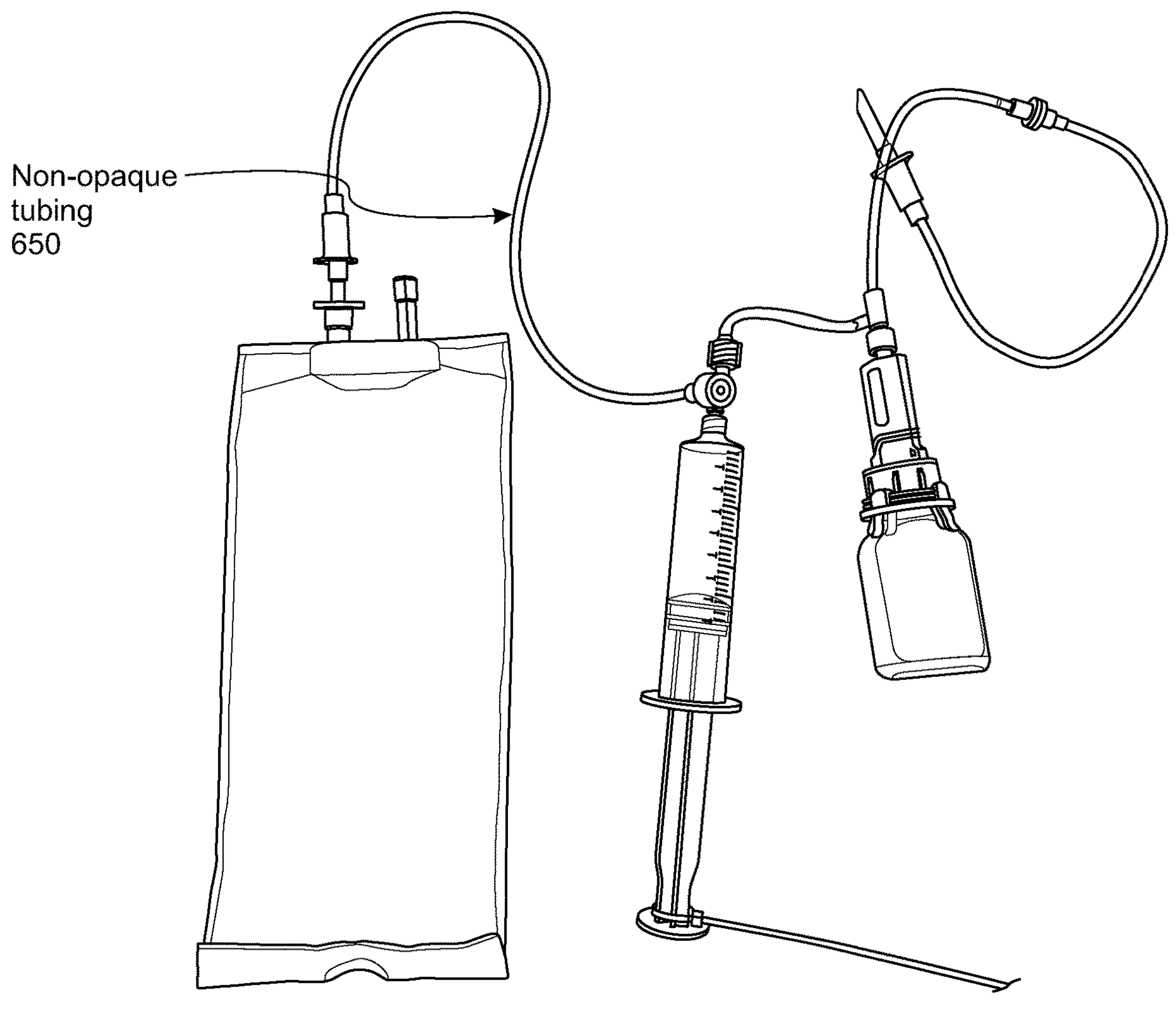
FIG. 6D illustrates an example of non-opaque tubing 150, in accordance with some embodiments of the presently disclosed subject matter.

FIG. 6D illustrates an example of non-opaque tubing 650 that can be utilized in a PCD.

Figure 7:
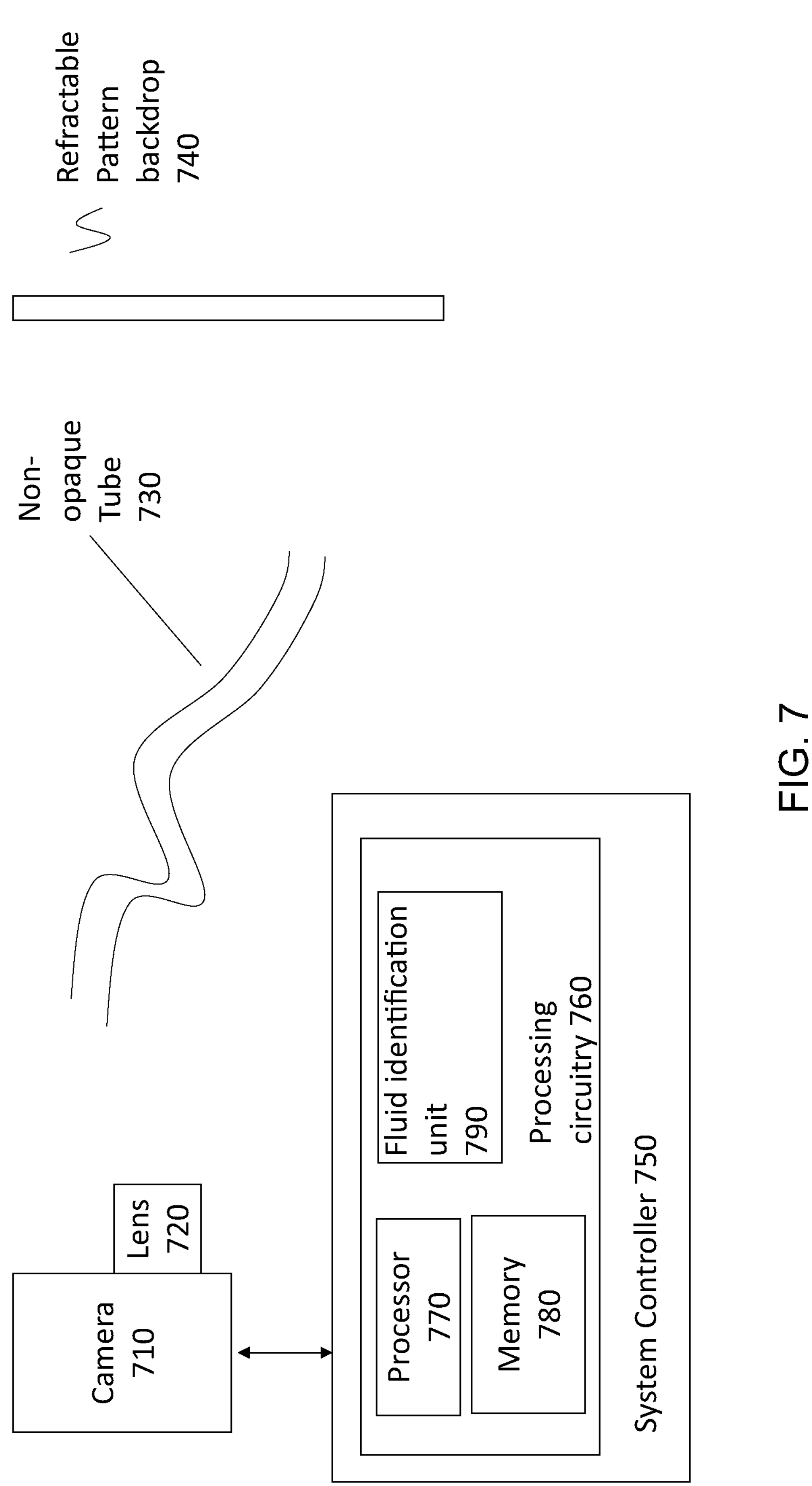
FIG. 7, illustrates an example subsystem of a pharmaceutical compounding device (PCD), in accordance with some embodiments of the presently disclosed subject matter.

Attention is now directed to FIG. 7, which illustrates an example subsystem of a pharmaceutical compounding device (PCD), the subsystem being configured to perform refraction-based detection of fluid and/or air in a non-opaque tube, in accordance with some embodiments of the presently disclosed subject matter.

Non-opaque tube 730 can be a type of non-opaque tubing or fluid transport/storage medium, such as tubing of a type usable in preparation of pharmaceutical injections. In some embodiments, non-opaque tube 730 can be flexible tubing as shown in FIG. 6D. In some embodiments, the tube can be rigid. In some embodiments, non-opaque tube 730 can be fluid storing and/or transferring container such as a syringe, a vial, an IV bag, etc.

As referred to herein, "non-opaque" may include a transparent, translucent, semi-transparent or other material which allows light to pass through, at least to some degree.

Camera 710 can be any type of suitable image capturing device, and can include lens 720, which can be directed in a particular lens direction.

Refractable pattern backdrop 740 can be a flat or non-flat surface (e.g. cardboard, metal, or any other suitable material) bearing or exhibiting a pattern—for example: a contrasting pattern such as contrasting black and white parallel lines. In some embodiments, the lines are in a diagonal orientation. More generally, the lines are angled with respect to a major axis of the tube, e.g. a longitudinal axis of the tube, so that they form an asymmetric pattern with respect to the main axis of the non-opaque tube.

In some embodiments, non-opaque tube 730 is positioned such that it is interposed between lens 720 and refractable pattern backdrop 740. Consequently, in some examples, images captured by camera 710 will feature non-opaque tube 730 in front of refractable pattern backdrop 770 (see for example FIG. 8B below).

System controller 750 can be operably connected to camera 710 and can receive images captured by camera 710. System controller 750 can include processing circuitry 760, which in turn can include processor 770 and memory 780.

Processor 770 can be a suitable hardware-based electronic device with data processing capabilities, such as, for example, a general purpose processor, digital signal processor (DSP), a specialized Application Specific Integrated Circuit (ASIC), Graphical Processing Unit (GPU), one or more cores in a multicore processor, etc. Processor 770 can also consist, for example, of multiple processors, multiple ASICs, virtual processors, combinations thereof etc.

Memory 780 can be, for example, a suitable kind of volatile and/or non-volatile storage, and can include, for example, a single physical memory component or a plurality of physical memory components. Memory 780 can also include virtual memory. Memory 780 can be configured to, for example, store various data used in computation.

Processing circuitry 760 can be configured to execute several functional modules in accordance with computer-readable instructions implemented on a non-transitory computer-readable storage medium. Such functional modules are referred to hereinafter as comprised in the processing circuitry. These modules can include, for example, fluid identification unit 790.

Fluid identification unit 790 can receive images captured by camera 710 e.g. images of non-opaque tube 730 in front of patterned background 740 at specific stages in the course of pharmaceutical preparation. Fluid identification unit 790 can then identify the contents of sections of non-opaque tube 730 in accordance with the extent to which the pattern background(s) detected in non-opaque tube 730 have been refracted, as will be described hereinbelow.

It is noted that the teachings of the presently disclosed subject matter are not bound by the reflection-based fluid detection subsystem and associated components described with reference to FIG. 7. Equivalent and/or modified functionality can be consolidated or divided in another manner and can be implemented in any appropriate combination of software with firmware and/or hardware and executed on a suitable device.

Figure 8A:
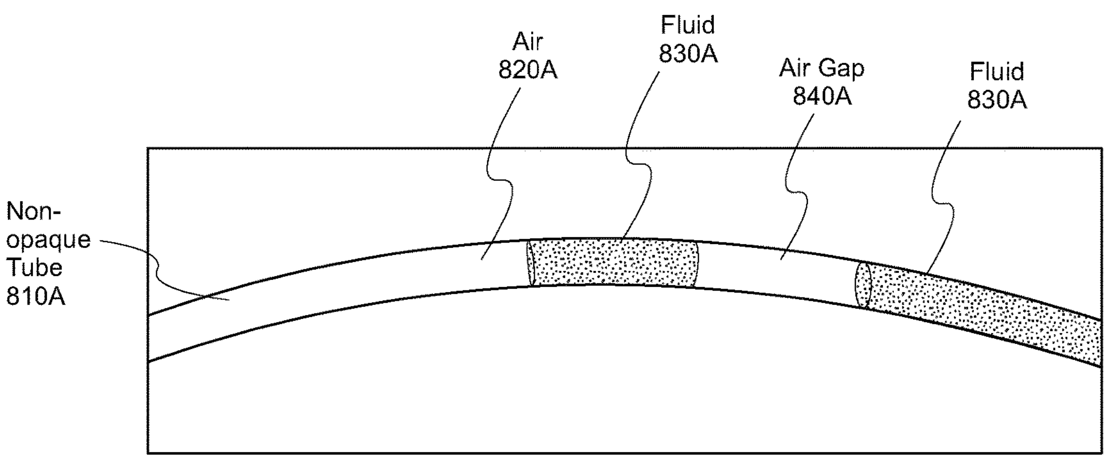
FIG. 8A depicts an example non-opaque tube, in accordance with some embodiments of the presently disclosed subject matter.

FIG. 8A illustrates an example non-opaque tube, in accordance with some embodiments of the presently disclosed subject matter.

In FIG. 8A, non-opaque tube 810A is partially filled with fluid, and includes an air gap. Specifically there are fluid regions 830A, air region 820A, and air gap 840A. Though the regions are discernable, the contents of the tube are not necessarily evident, for example because fluid and air both appear differently in different types of tube. Accordingly, computer vision detection of the fluid type could be difficult or error prone.

Figure 8B:
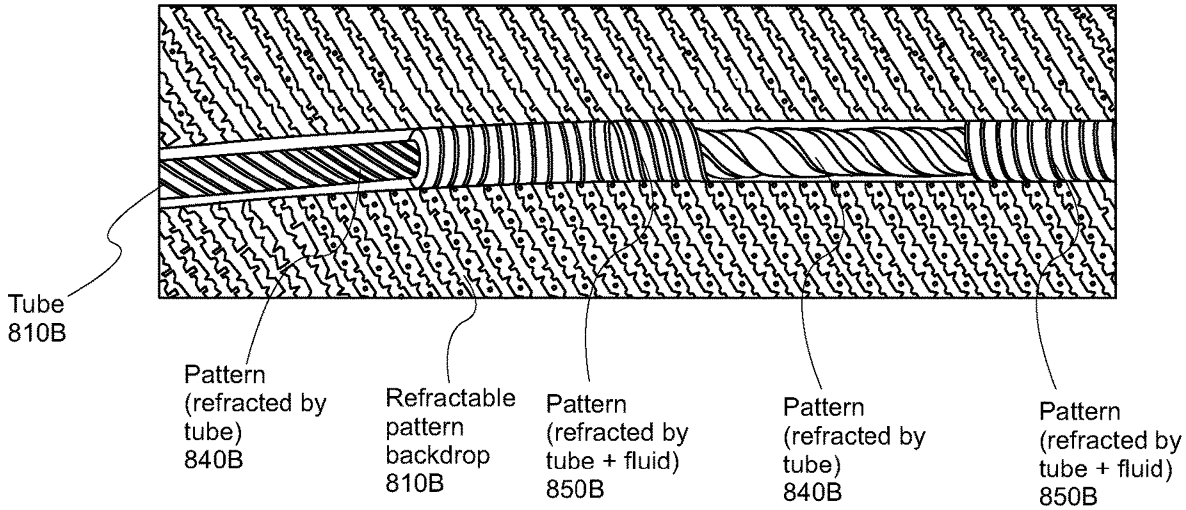
FIG. 8B depicts an example non-opaque tube in front of a refractable pattern backdrop, in accordance with some embodiments of the presently disclosed subject matter.

FIG. 8B shows an example image of a non-opaque tube in front of a refractable pattern backdrop, in accordance with some embodiments of the presently disclosed subject matter.

Fluids of different viscosities are known to refract light to varying degrees, the degree of refraction imposed by a particular substance is sometimes known as its refractive index (cf. https://en.wikipedia.org/wiki/Refractive_index). The non-opaque tube 810A can also impose a particular level of refraction.

In FIG. 8B, four regions of non-opaque tube 810B are distinctly identifiable, with distinct changes in in the degree of refraction of refractable pattern backdrop 810B being clearly visible. Two regions 840B show the pattern as refracted by the tube 810B only, and two regions 850B show the pattern as refracted by both the tube 810B and the contained fluid.

Accordingly, system controller 750 can identify the contents of regions of the tube 810B and perform appropriate actions, such as continuing or halting the drawing or injection of fluid, mitigating a presence of a bubble or air gap etc.

As well, the degree of refraction of a region in tube 810B is indicative of the type of fluid in the tube, and system controller 750 can raise an alert if a fluid in tube 810B exhibits a degree of refraction that differs from the refraction of the expected fluid—as this may be indicative of an error in the pharmaceutical preparation.

Figure 9:
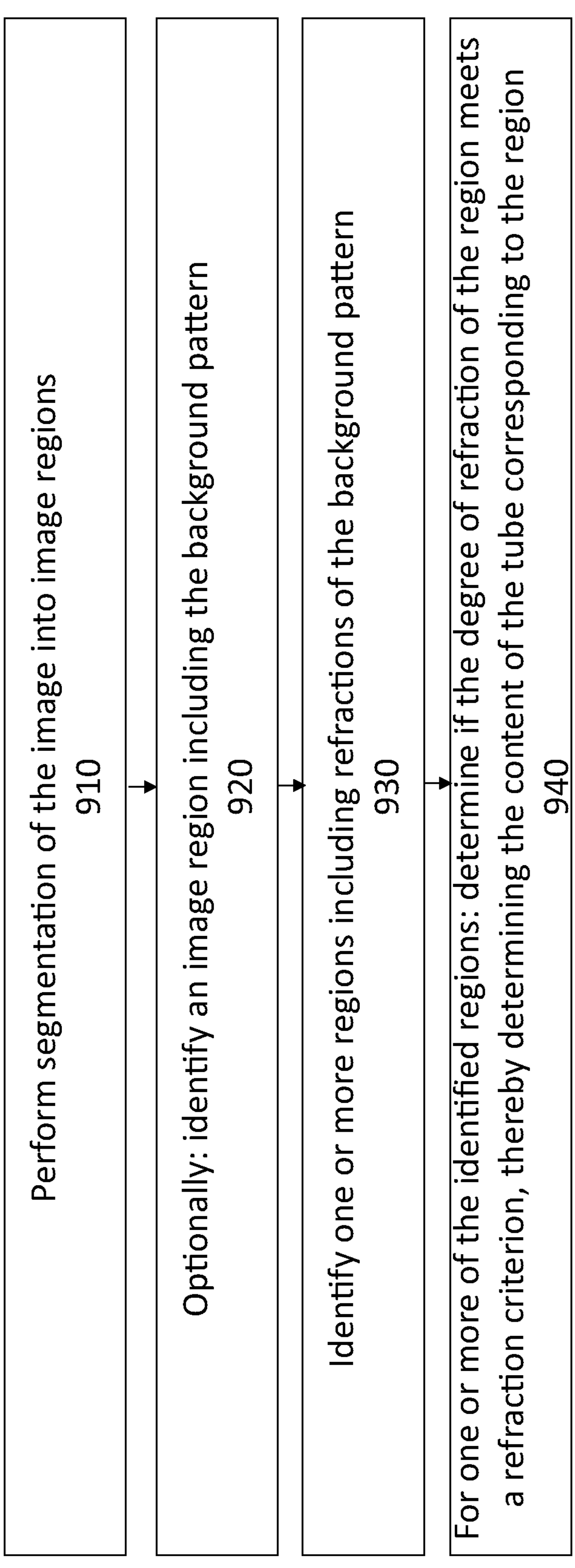
FIG. 9 illustrates a flow diagram of an example method of identifying fluid or air in a region of a non-opaque tube, from a captured image, in accordance with some embodiments of the presently disclosed subject matter.

Attention is now directed to FIG. 9, which illustrates a flow diagram of an example method of identifying fluid or air in a region of a non-opaque tube, from a received image, in accordance with some embodiments of the presently disclosed subject matter.

Processing circuitry 760 (e. g. fluid identification unit 790) can perform 910 segmentation of the image into image regions. For example: processing circuitry 760 (e. g. fluid identification unit 790) can utilize an image processing-oriented machine learning (ML) model such as Yolo5 to segment and demarcate the particular regions of the image. In processing the example image for FIG. 8B, such a model might identify the regions 810B 840B 850B by discerning the pattern differences resulting from the differential diffraction.

Processing circuitry 760 (e. g. fluid identification unit 790) can use various methods to determine, from at least one of the image regions, a content characteristic of the non-opaque tube. Examples of content characteristics include: identifying of fluid type, such identifying presence of gas (e.g. air) and presence of liquid; identifying of fluid viscosity; identifying of a level of cloudiness in the fluid; or other characteristics related to the contents of the tube.

By way of non-limiting example: processing circuitry 760 (e. g. fluid identification unit 790) can infer from the presence of two distinct image regions (as discerned by Yolo5, that the non-opaque tube is partially full. Likewise processing circuitry 760 (e. g. fluid identification unit 790) can infer from the presence of a first image region characterized by a first diffraction pattern, a second image region characterized by a second diffraction pattern and a third image region characterized by the first diffraction pattern, the existence of discontinuity in the material located in the tube, e.g., discontinuity in the fluid due to the existence of an airgap. The remaining steps of FIG. 9 describe a method of identifying presence and possibly size of air and/or fluid regions in the non-opaque tube.

Optionally: processing circuitry 760 (e. g. fluid identification unit 790) can then identify 920 an image region including the refractable pattern backdrop 740.

In some embodiments, processing circuitry 760 (e. g. fluid identification unit 790) can then use the pattern of the refractable pattern backdrop 740 for matching to image regions that are—potentially—refractions of the refractable pattern backdrop 740. In some other embodiments, the pattern of refractable pattern backdrop 740 is preconfigured or otherwise previously made available to processing circuitry 760 (e. g. fluid identification unit 790), so that in such embodiments identifying the image region that includes the refractable pattern backdrop 740 is not necessary.

By way of non-limiting example: in the image of FIG. 8B, processing circuitry 760 (e. g. fluid identification unit 790) might identify the refractable pattern backdrop 810B in the image.

Processing circuitry 760 (e. g. fluid identification unit 790) can next identify 930 one or more regions of the captured image that include refractions of the refractable pattern backdrop 740.

In some embodiments, processing circuitry 760 (e. g. fluid identification unit 790) analyzes each segmented region of the image to find a refracted pattern. In some other embodiments, processing circuitry 760 (e. g. fluid identification unit 790) halts the analysis after finding a single region containing a refracted pattern. In some other embodiments, processing circuitry 760 (e. g. fluid identification unit 790) halts according to some other criteria.

In some embodiments, processing circuitry 760 (e. g. fluid identification unit 790) only analyzes a region after it has determined (using an appropriate method) that the region is located inside non-opaque tube 810B. In some other embodiments, processing circuitry 760 (e. g. fluid identification unit 790) analyzes all regions. In some other embodiments, processing circuitry 760 (e. g. fluid identification unit 790) selects regions for analysis according to different criteria.

In some embodiments, processing circuitry 760 (e. g. fluid identification unit 790) evaluates (using an appropriate image processing method) whether an image region matches an expected (e.g. pre-configured according to an expected type of fluid) degree of refraction of the refractable pattern backdrop 740. In some other embodiments, processing circuitry 760 (e. g. fluid identification unit 790) evaluates (using an appropriate image processing method) whether the image region matches any degree of refraction of the refractable pattern backdrop 740. In some such embodiments, processing circuitry 760 (e. g. fluid identification unit 790) can determine the degree of refraction (e.g. refractive index) of the fluid or air (possibly in combination with the refractive index of non-opaque tube 810B).

Processing circuitry 760 (e. g. fluid identification unit 790) can next, for one or more of the identified image regions found to contain refractions of refractable pattern backdrop 740, determine 940 whether the degree of refraction of the region meets a respective refraction criterion for identification of the image region with particular content.

In some embodiments, the refraction criterion can be a matching particular degree of refraction (e.g. refractive index value). For example, the refraction criterion can be whether the degree of refraction of the image region matches the degree of refraction expected for a particular fluid (e.g. saline solution) or gas (e.g., air) that is present in the particular type of non-opaque tube 730. In this context, "matches" means matching within an interval of variation, so that normal variations in the fluid, tube, or imaging will not affect correct identification of the fluid or air.

In some embodiments, the refraction criterion can be meeting a threshold degree of refraction (e.g. refractive index value). For example, the refraction criterion can be whether the degree of refraction of the image region meets the minimum degree of refraction resulting from the presence of some kind of fluid in all known types of non-opaque tube 730. In such an example, the determined degree of refraction meeting the refraction criterion can be indicative of the presence of fluid in non-opaque tube 230, and the determined degree of refraction not meeting the refraction criterion can be indicative of the absence of fluid in non-opaque tube 730.

It is noted that the teachings of the presently disclosed subject matter are not bound by the flow chart illustrated in FIG. 9, the illustrated operations can occur out of the illustrated order. For example, operations 930 and 940, shown in succession, can be executed substantially concurrently, or in the reverse order. It is also noted that whilst the flow chart is described with reference to elements of the system of FIG. 7, this is by no means binding, and the operations can be performed by elements other than those described herein.

Figure 10A:
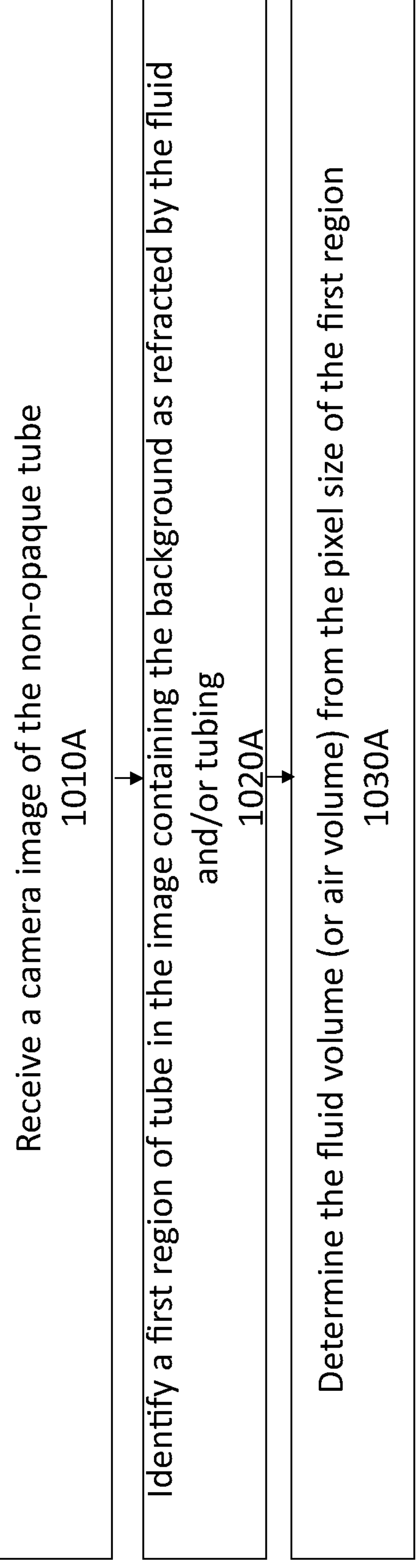
FIG. 10A illustrates a flow diagram of an example method of pharmaceutical preparation in a PCD, wherein the processing utilizes refraction-based fluid identification, in accordance with some embodiments of the presently disclosed subject matter.
Figure 10B:
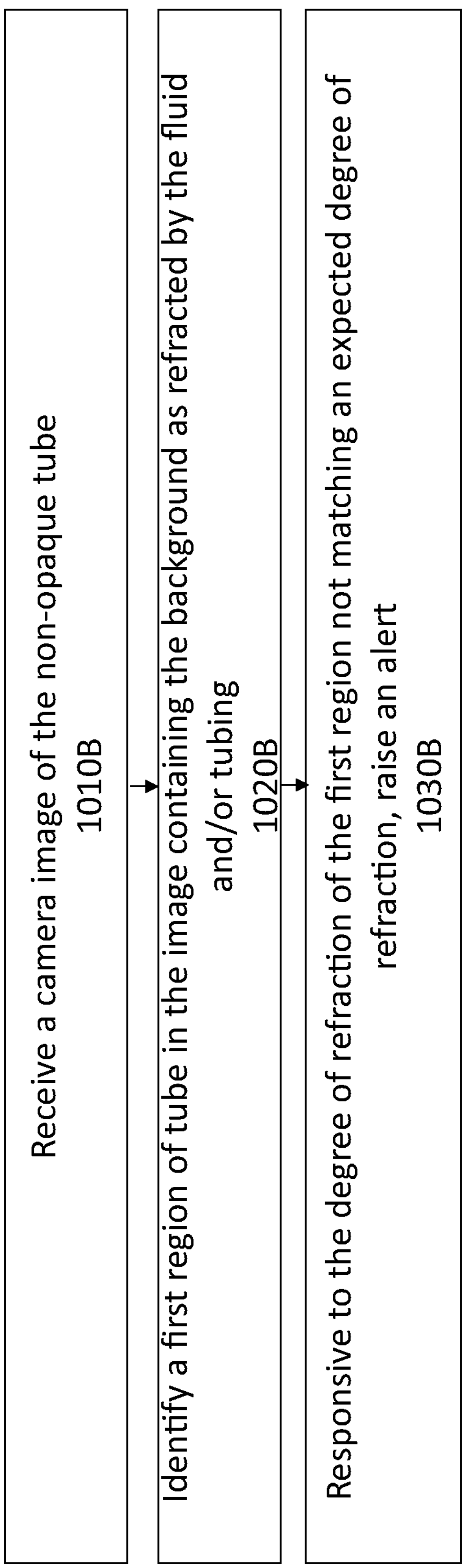
FIG. 10B illustrates a flow diagram of an additional example method of pharmaceutical preparation in a PCD, wherein the processing utilizes refraction-based fluid identification, in accordance with some embodiments of the presently disclosed subject matter.
Figure 10C:
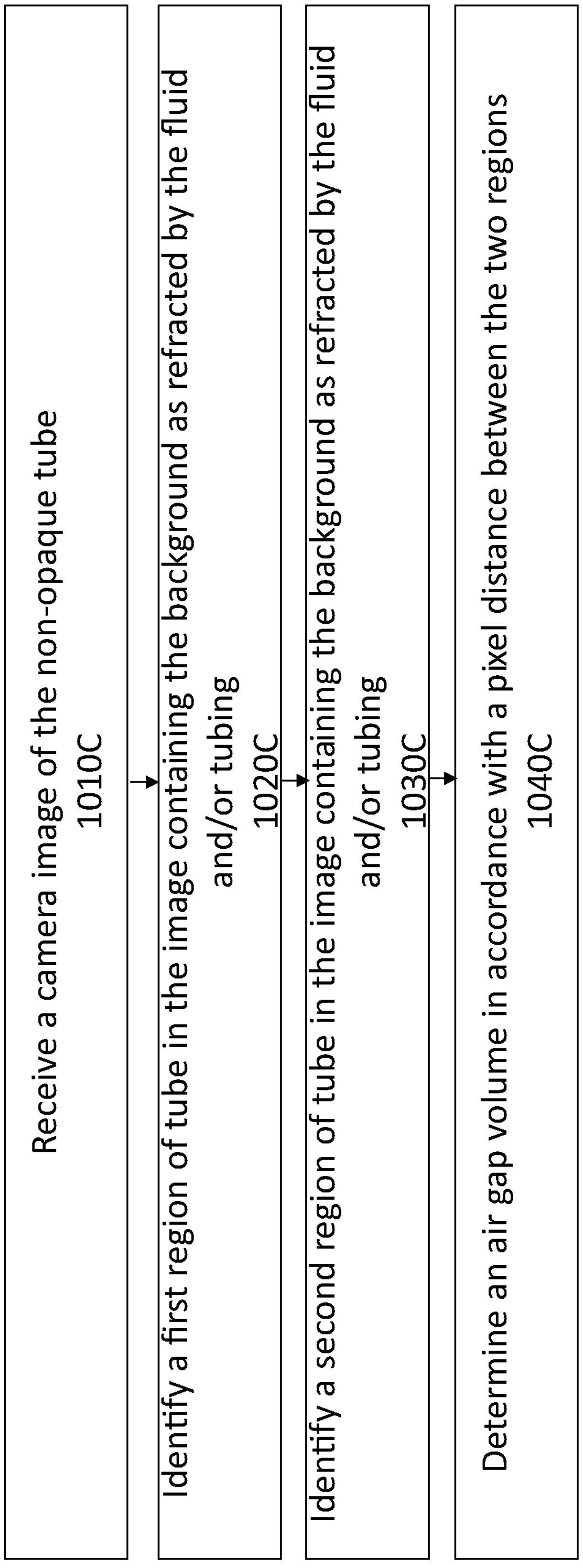
FIG. 10C illustrates a flow diagram of an additional example method of pharmaceutical preparation in a PCD, wherein the processing utilizes refraction-based fluid identification, in accordance with some embodiments of the presently disclosed subject matter.

Attention is now drawn to FIGS. 10A-10C, which illustrate flow diagrams of example methods of pharmaceutical preparation in a PCD, wherein the processing utilizes refraction-based fluid identification, in accordance with some embodiments of the presently disclosed subject matter.

In FIG. 10A, processing circuitry 760 (e. g. fluid identification unit 790) can receive 1010A a camera image of the non-opaque tube 730.

Processing circuitry 760 (e. g. fluid identification unit 790) can then identify 1020A a first region of tube in the image containing the background as refracted by the fluid or air (possibly in combination with refraction imposed by the non-opaque tube 730). The identification of the image region with fluid or air can be performed for example by a method such as the one described above with reference to FIG. 9.

Processing circuitry 760 (e. g. fluid identification unit 790) can then determine 1030A the fluid volume (or air volume) in the non-opaque tube 730, using the pixel size of the first region in combination with an appropriate method.

In FIG. 10B, processing circuitry 760 (e. g. fluid identification unit 790) can receive 1010B a camera image of the non-opaque tube 730.

Processing circuitry 760 (e. g. fluid identification unit 790) can then identify 1020B a first region of tube in the image containing the background as refracted by the fluid or air (possibly in combination with refraction imposed by the non-opaque tube 730), and can determine the degree of refraction (e.g. refractive index) of the image region.

Processing circuitry 760 (e. g. fluid identification unit 790) can maintain data indicative of an expected the degree of refraction, for example: processing circuitry 760 (e. g. fluid identification unit 790) may maintain awareness of the pharmaceutical preparation fluid type which should be present in non-opaque tube 730. Processing circuitry 760 (e. g. fluid identification unit 790) can then detect whether the degree of the refraction of the first region matches the expected degree of refraction.

If the degree of the refraction of the first region does not match the expected degree of refraction, this may be an indication of a fault in the pharmaceutical preparation process.

Accordingly, responsive to the degree of refraction of the first region not matching an expected degree of refraction, processing circuitry 760 (e. g. fluid identification unit 790) can raise 1030B an alert.

In FIG. 10C, processing circuitry 760 (e. g. fluid identification unit 790) can receive 1010C a camera image of the non-opaque tube 730.

Processing circuitry 760 (e. g. fluid identification unit 790) can then identify 1020C a first region of tube in the image containing the background as refracted by the fluid or air (possibly in combination with refraction imposed by the non-opaque tube 730).

Processing circuitry 760 (e. g. fluid identification unit 790) can then identify 1030C a second region of tube in the image containing the background as refracted by the fluid or air (possibly in combination with refraction imposed by the non-opaque tube 730).

Processing circuitry 760 (e. g. fluid identification unit 790) can then determine 1040C the volume of the air gap between the two fluid regions in the non-opaque tube 730, using the pixel distance between the first image region and the second image region, in combination with an appropriate pixel-to-volume calculation method.

It is noted that the teachings of the presently disclosed subject matter are not bound by the flow charts illustrated in FIG. 10A-10C, the illustrated operations can occur out of the illustrated order. It is also noted that whilst the flow chart is described with reference to elements of the system of FIG. 7, this is by no means binding, and the operations can be performed by elements other than those described herein.

Figure 11A:
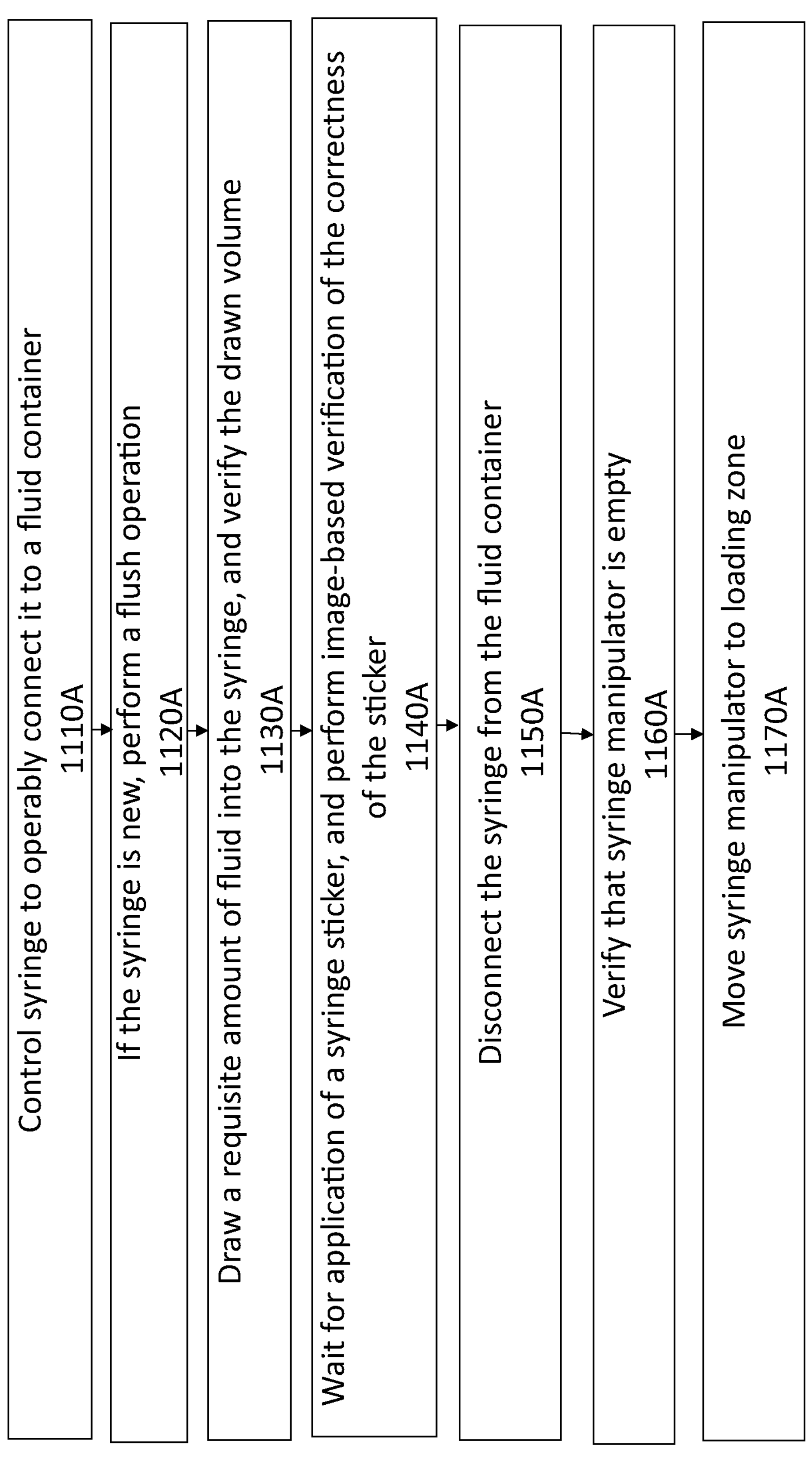
FIG. 11A illustrates a flow diagram of an example method of a compounding process of a pharmaceutical preparation in a PCD, resulting in a prepared syringe, in accordance with some embodiments of the presently disclosed subject matter.

FIG. 11A illustrates an example flow of a robotic compounding process which results in a syringe that is prepared for injection into a patient.

A processing circuitry can position a syringe manipulator at a device location configured for operations between a syringe and a fluid container (e.g. a vial), by operably connecting (1110A) the syringe to the fluid container (e.g. via a vial adaptor and/or a syringe connector, or directly).

The processing circuitry can next—for example: in a case where the syringe has not yet been used—control the syringe manipulator and specifically the plunger holder to perform a "flush" (1120A) on the syringe i.e. expel any air that is present. More specifically, the processing circuitry can control a syringe manipulator to withdraw a plunger by e.g. 2 millimeters from the syringe barrel, and then reinsert the plunger.

The processing circuitry can cause drawing (1130A) of a requisite amount of fluid into the syringe, and verify the drawn volume. These processes are described in detail above, with reference to FIGS. 5A-5C, and FIGS. 4A-4B respectively. During these processes, images can be captured and processed for one or more of: verifying the volume of fluid withdrawn, identifying and/or mitigating a bubble or air gap, determining that a vial had been emptied, determining if a syringe is dislocated.

At this stage, the human operator can prepare a label (sticker) for the fluid being prepared (e.g. in English and/or including a bar-code).

The processing circuitry can wait for application of a syringe sticker, and responsive to imaging-based detection of the sticker, processing circuitry can perform image-based verification (1140A) of the correctness of the sticker. If the sticker is correct i.e. matches the preparation performed by the robotic compounding process, the processing circuitry can control the syringe manipulator to disconnect (1150A) the syringe from the fluid container. If on the other hand, the sticker is incorrect, processing circuitry can signal to the operator that a new sticker is needed.

Processing circuitry can then verify (1160A) that the operator has removed the syringe i.e. that the syringe manipulator is empty. Finally, processing circuitry can move (1170A) the syringe manipulator to a loading zone (i.e. a location where a new syringe is first retrieved.

Figure 11B:
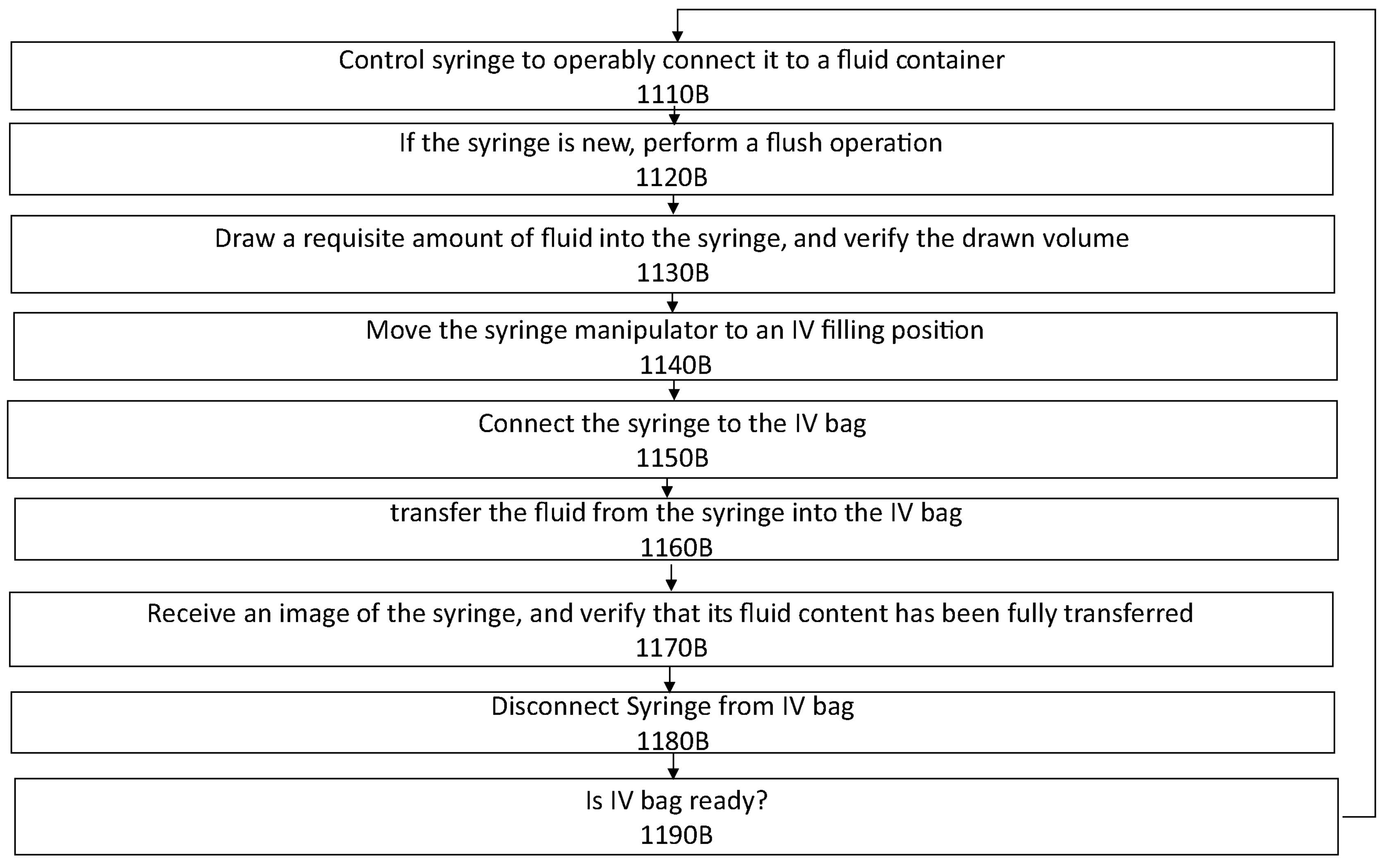
FIG. 11B illustrates a flow diagram of an example method of a compounding process of a pharmaceutical preparation in a PCD, resulting in a prepared intravenous bag, in accordance with some embodiments of the presently disclosed subject matter.

FIG. 11B illustrates an example flow of a robotic compounding process which results in an IV bag for administering to a patient or storing.

Initial steps of this method are the same as those described for FIG. 11A above.

Subsequent to drawing fluid into the syringe processing circuitry can move (1140B) the syringe manipulator to an IV filling position. Processing circuitry can next connect (1150B) the syringe to the IV bag.

Processing circuitry can control the syringe manipulator to transfer (1160B) the fluid from the syringe and into the IV bag (for example, as described in FIG. 5A-5C above).

Processing circuitry can receive an image of the syringe, and can use image processing techniques to verify (1170B) that the contents of the syringe were fully transferred into the IV bag (for example, as described in FIGS. 4A-5B above).

Processing circuitry can then disconnect (1180B) the syringe from the IV bag.

If the IV bag preparation is complete (1190B), then processing can terminate. As in the process in FIG. 11A, processing circuitry can maintain connection to the IV bag until the operator affixes a label or sticker (e.g. English or barcode describing the contents of the IV bag). Processing circuitry can then verify the label or sticker, and release the IV bag upon successful verification.

If the IV bag preparation is not complete (1190B), then processing can return to step 1110B.

It is noted that the teachings of the presently disclosed subject matter are not bound by the flow charts illustrated in FIG. 11A-10B, the illustrated operations can occur out of the illustrated order. It is also noted that whilst the flow chart is described with reference to elements of the system for example as shown in FIG. 2, this is by no means binding, and the operations can be performed by elements other than those described herein.

SUMMARY

Example 1

A system of determining presence of fluid or air in a non-opaque tube in a pharmaceutical preparation device, the system comprising:

a processing circuitry (PC), the PC being configured to:

a) receive a camera image of the non-opaque tube, the non-opaque tube being positioned, from a camera perspective, in front of a patterned background, the received image thereby depicting one or more regions of the non-opaque tube, wherein each region is associated with a respective degree of refraction of the patterned background; and b) identify, using image processing techniques, in the received image, one or more of the regions of the non-opaque tube; and c) determine from, at least, one or more of the identified regions, a content characteristic of the non-opaque tube.

Example 2

The system of example 1, wherein the PC is further configured to perform the determination of the content characteristic based on the degree of refraction associated with the one or more of the identified regions, thereby giving rise to an indication of a type of content present in the non-opaque tube.

Example 3

The system of example 2, wherein the PC determines whether the associated degree of refraction of one of the identified regions matches a degree of refraction characteristic of air in the non-opaque tube.

Example 4

The system of example 2, wherein the PC determines whether the associated degree of refraction of one of the identified regions matches a degree of refraction characteristic of a liquid in the non-opaque tube.

Example 5

The system of any one of examples 1-4, wherein the PC is further configured to:

determine a volume of a region of the non-opaque tube, based on pixel dimensions of one of the identified regions of the image.

Example 6

The system of any one of examples 1-5, wherein the PC is further configured to:

determine a volume of a gap between regions of the non-opaque tube, in accordance with a pixel distance between a first identified region of the image and a second identified region of the image.

Example 7

The system of any one of examples 1-6, wherein the PC is further configured to:

responsive to a degree of refraction associated with one of the identified regions not matching a degree of refraction of an expected fluid:

raising an alert.

Example 8 a processing circuitry-based method of determining presence of liquid or air in a non-opaque tube in a pharmaceutical preparation device, the method comprising:

a) receiving a camera image of the non-opaque tube, the non-opaque tube being positioned, from a camera perspective, in front of a patterned background, the received image thereby depicting one or more regions of the non-opaque tube, wherein each region is associated with a respective degree of refraction of the patterned background; and b) identifying, using image processing techniques, in the received image, one or more of the regions of the non-opaque tube; and c) determining from, at least, one or more of the identified regions, a content characteristic of the non-opaque tube.

Example 9 a computer-readable storage medium comprising instructions which, when executed by a computer, cause the computer to carry out the steps of example 8.

Example 10

The system of example 1, the system additionally comprising:

the camera, being positionable to capture an image of the non-opaque tube; and the patterned background, being positionable to appear behind the non-opaque tube in an image captured by the camera.

Example 11

The system of example 10, wherein the patterned background comprises a region of parallel lines.

Example 12

The system of example 11, wherein the parallel lines are in a diagonal orientation relative to a main axis of the tube.

Example 13

The system of example 11, wherein each of the parallel lines is at angle of between 1-179 degrees relative to a main axis of the tube.

Example 14

A robotic system of drawing a fluid from a fluid container into a syringe, the system comprising a processing circuitry (PC) configured to:

a) control a fluid-drawing subsystem to withdraw a plunger arm of a syringe that is operably connected to a first fluid container, by a withdrawal distance;

b) receive a digital image of the syringe; and c) responsive to detection, using image processing techniques, of a bubble or air gap in the captured digital image:

control the fluid-drawing subsystem to push the plunger arm by a push distance that is in accordance with:

a bubble or air-gap size that is determined based on the captured image.

Example 15

The system of example 14, wherein the PC is further configured to:

d) subsequent to the control of the fluid-drawing subsystem to push the plunger arm: repeat a)-c) for one or more additional iterations, wherein the control of the fluid-drawing subsystem, at each iteration, withdraws the plunger arm by a respective incremental withdrawal distance, until the plunger arm is withdrawn from the syringe by a full withdrawal distance, wherein the full withdrawal distance is determined based on a required syringe fill volume.

Example 16

The system of example 14, wherein the PC is further configured to, d) responsive to an empty fluid container condition, control a container replacement subsystem to replace the first fluid container with a second fluid container; and e) repeat a)-c) for one or more additional iterations, wherein the control of the fluid-drawing subsystem, at each iteration, withdraws the plunger arm by a respective incremental withdrawal distance, until the plunger arm is withdrawn from the syringe by a full withdrawal distance, wherein the full withdrawal distance is determined based on a required syringe fill volume.

Example 17

The system of any one of examples 14-16, wherein the PC is further configured to:

receive a post-drawing digital image of the syringe;

estimate, from the post-drawing digital image, using image processing techniques, a volume of the fluid; and responsive to the estimated fluid volume differing from the required syringe fill volume by an amount exceeding a fluid volume tolerance:

raising an alert.

Example 18

The system of any one of examples 14-17, wherein the withdrawal distance is a full withdrawal distance determined based on a required syringe fill volume.

Example 19

The system of any one of examples 14-18, wherein the PC is further configured to control the fluid-drawing subsystem to withdraw the plunger arm by:

controlling an actuator to move the plunger arm by the withdrawal distance.

Example 20

The system of any one of examples 14-19, wherein the PC is further configured to:

perform the calculation of the push distance based on, at least, a pixel diameter of the bubble or air-gap in the captured digital image.

Example 21

The system of any one of examples 14-20, wherein the PC is further configured to, responsive to a count of successive detected bubbles or air-gaps meeting a successive detected bubble threshold:

reducing a speed of the actuator that moves the plunger arm.

Example 22

The system of any one of examples 14-22, wherein the PC is further configured to, responsive to a count of successive detected bubbles or air-gaps meeting a successive detected bubble threshold:

raising a misconfigured fluid container alert.

Example 23

The system of any one of examples 14-22, wherein the digital image was captured with the syringe being positioned, from a camera perspective, in front of a patterned background, the received image thereby depicting one or more regions of the syringe, wherein each region is associated with a respective degree of refraction of the patterned background, and wherein the PC is further configured to detect a bubble or air gap in the captured digital image by:

a) identifying, using image processing techniques, in the captured image, one or more of the regions of the syringe; and b) determining based on, at least, one or more of the identified regions, presence of a bubble or airgap in the syringe.

Example 24

The system of example 23, wherein the PC is further configured to perform the determination of the presence of a bubble or airgap based on the degree of refraction associated with the one or more of the identified regions.

Example 25

The system of example 16, wherein the empty fluid container condition is based on the PC performing image processing of an image of the fluid container.

Example 26

The system of example 16, wherein the empty fluid container condition is based on maintenance, by the PC, of a fluid container fill level.

Example 27

A processing circuitry-based method of drawing a fluid from a fluid container into a syringe, the method comprising:

a) controlling a fluid-drawing subsystem to withdraw a plunger arm of a syringe that is operably connected to a first fluid container, by a withdrawal distance;

b) receiving a digital image of the syringe; and c) responsive to detection, using image processing techniques, of a bubble or air gap in the captured digital image:

controlling the fluid-drawing subsystem to push the plunger arm by a push distance that is in accordance with:

a bubble or air-gap size that is determined based on the captured image.

Example 28

A computer-readable storage medium comprising instructions which, when executed by a computer, cause the computer to carry out the steps of example 27.

Example 29

A system of drawing a fluid from a fluid container into a syringe, the system comprising a processing circuitry (PC) configured to:

a) control a fluid-drawing subsystem to withdraw a plunger arm of a syringe that is operably connected to a first fluid container containing a first fluid volume, by a withdrawal distance, b) receive a digital image of the syringe;

c) responsive to detection, using image processing techniques, of a bubble or air gap in the captured digital image:

control the fluid-drawing subsystem to re-insert the plunger arm by a reinsertion distance that is in accordance with:

a bubble or air-gap size that is determined based on the captured image; and d) repeat a)-c) until occurrence of an empty fluid container condition, wherein the control of the fluid-drawing subsystem, at each iteration, withdraws the plunger arm by a respective incremental withdrawal distance.

Example 30

The system of example 27, wherein the empty fluid container condition is based on the PC performing image processing of an image of the fluid container.

Example 31

The system of example 27, wherein the empty fluid container condition is based on maintenance, by the PC, of a fluid container fill level.

Example 32

A processing circuitry-based method of drawing a fluid from a fluid container into a syringe, the method comprising:

a) controlling a fluid-drawing subsystem to withdraw a plunger arm of a syringe that is operably connected to a first fluid container containing a first fluid volume, by a withdrawal distance;

b) receiving a digital image of the syringe;

c) responsive to detecting, using image processing techniques, a bubble or air gap in the captured digital image:

controlling the fluid-drawing subsystem to re-insert the plunger arm by a reinsertion distance that is in accordance with:

a bubble or air-gap size that is determined based on the captured image; and d) repeating a)-c) until occurrence of an empty fluid container condition, wherein the control of the fluid-drawing subsystem, at each iteration, withdraws the plunger arm by a respective incremental withdrawal distance.

Example 33 The method of example 32, wherein the empty fluid container condition is based on the PC performing image processing of an image of the fluid container.

Example 34

The method of example 32, wherein the empty fluid container condition is based on maintenance, by the PC, of a fluid container fill level.

Example 35

A computer-readable storage medium comprising instructions which, when executed by a computer, cause the computer to carry out the steps of any one of examples 32-34.

Example 36

A system of verifying drawing of a required volume of fluid into a syringe, the system comprising a processing circuitry (PC) operably connectable to a plunger holder configured to withdraw a plunger inserted into the syringe, wherein the syringe is operably connected to a fluid container, the PC being configured to:

a) control the plunger holder to withdraw the plunger to a first plunger withdrawal distance, the first plunger withdrawal distance being based on the required volume, thereby moving the plunger holder from a first plunger holder position to a second plunger holder position; and b) receive a digital image of the syringe, captured subsequent to the withdrawing, and determine, using image processing techniques upon the digital image of the syringe, whether a current volume of fluid in the syringe is in accordance with the required fluid volume.

Example 37

The system of example 36, wherein the PC is further configured to, prior to a):

receive a first digital image, of the plunger holder at the first plunger holder position; and wherein the PC is further configured to, subsequent to b):

responsive to the current volume of fluid in the syringe not being in accordance with the required fluid volume:

a. receive a second digital image, of the plunger holder at the second plunger holder position;

b. determine, using image processing techniques upon the first digital image of the plunger holder and the second digital image of the plunger holder, whether the second position of the plunger holder is in accordance with the first position of the plunger holder and the first plunger withdrawal distance, c. responsive to the second position of the plunger holder being in accordance with the first position of the plunger holder and the first plunger movement distance:

raise a misconfigured syringe alert.

Example 38

A processing circuitry-based method of verifying drawing of a required volume of fluid into a syringe, the method comprising:

a) controlling a plunger holder to withdraw a plunger to a first plunger withdrawal distance, the first plunger withdrawal distance being based on a required volume, thereby moving the plunger holder from a first plunger holder position to a second plunger holder position; and b) receiving a digital image of the syringe, captured subsequent to the withdrawing, and determining, using image processing techniques upon the digital image of the syringe, whether a current volume of fluid in the syringe is in accordance with the required fluid volume.

Example 39

The method of example 38, further comprising, prior to a):

receiving a first digital image, of the plunger holder at the first plunger holder position; and the method further comprising, subsequent to b):

responsive to the current volume of fluid in the syringe not being in accordance with the required fluid volume:

a. receiving a second digital image, of the plunger holder at the second plunger holder position;

b. determining, using image processing techniques upon the first digital image of the plunger holder and the second digital image of the plunger holder, whether the second position of the plunger holder is in accordance with the first position of the plunger holder and the first plunger withdrawal distance, c. responsive to the second position of the plunger holder being in accordance with the first position of the plunger holder and the first plunger movement distance:

raising a misconfigured syringe alert.

Example 40

A computer-readable storage medium comprising instructions which, when executed by a computer, cause the computer to carry out the steps of any one of examples 38 to 39.

Example 41

A system of verifying transferring of a required volume of fluid from a syringe into a fluid container, the system comprising a processing circuitry (PC) operably connectable to a plunger holder configured to operate a plunger inserted into the syringe, wherein the syringe is operably connected to the fluid container, the PC being configured to:

a) control the plunger holder to push the plunger to a first plunger push distance, the first plunger insertion distance being based on the required volume, thereby moving the plunger holder from the first plunger holder position to a second plunger holder position; and b) receive a digital image of the syringe, captured subsequent to the pushing of the plunger, and determine, using image processing techniques upon the digital image of the syringe, whether a current volume of fluid in the syringe is in accordance with the required remaining fluid volume.

Example 42

The system of example 41, wherein the PC is further configured to, prior to a):

receive a first digital image, of the plunger holder at the first plunger holder position; and wherein the PC is further configured to, subsequent to b):

responsive to the current volume of fluid in the syringe not being in accordance with a required remaining fluid volume:

a. receive a second digital image, of the plunger holder at the second plunger holder position;

b. determine, using image processing techniques upon the first digital image of the plunger holder and the second digital image of the plunger holder, whether the second position of the plunger holder is in accordance with the first position of the plunger holder and the first plunger push distance, c. responsive to the second position of the plunger holder being in accordance with the first position of the plunger holder and the first plunger push distance:

raise a misconfigured syringe alert.

Example 43

A processing circuitry-based method of verifying drawing of a required volume of fluid into a syringe, the method comprising:

a) controlling a plunger holder to push a plunger to a first plunger insertion distance, the first plunger insertion distance being based on a required volume, thereby moving the plunger holder from a first plunger holder position to a second plunger holder position; and b) receiving a digital image of the syringe, captured subsequent to the pushing of the plunger, and determine, using image processing techniques upon the digital image of the syringe, whether a current volume of fluid in the syringe is in accordance with the required remaining fluid volume.

Example 44 The method of example 43, wherein the method comprises, prior to a):

receiving a first digital image, of the plunger holder at the first plunger holder position; and wherein the method comprises, subsequent to b):

responsive to the current volume of fluid in the syringe not being in accordance with a required remaining fluid volume:

a. receiving a second digital image, of the plunger holder at the second plunger holder position;

b. determining, using image processing techniques upon the first digital image of the plunger holder and the second digital image of the plunger holder, whether the second position of the plunger holder is in accordance with the first position of the plunger holder and the first plunger insertion distance, c. responsive to the second position of the plunger holder being in accordance with the first position of the plunger holder and the first plunger insertion distance:

raising a misconfigured syringe alert.

Example 45

A computer-readable storage medium comprising instructions which, when executed by a computer, cause the computer to carry out the steps of any one of examples 43 to 44.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A system for determining a presence of fluid or air in a non-opaque tube in a pharmaceutical preparation device, the system comprising:

a processing circuitry (PC), the PC being configured to:

a) receive a camera image of the non-opaque tube, the non-opaque tube being positioned, from a camera perspective, in front of a patterned backdrop separate from and outside of the non-opaque tube, and comprising a region of parallel diagonal lines extending in parallel along a direction diagonal to a longitudinal axis along which the non-opaque tube extends, the received camera image thereby depicting one or more depicted regions of the non-opaque tube, wherein each depicted region is associated with a respective degree of refraction of the patterned backdrop according with refraction apparent in the camera image of a respective depicted portion of the patterned backdrop behind said depicted region and wherein the one or more depicted regions include at least one bubble or air gap;

b) identify, using image processing techniques, in the received camera image, one or more of the depicted regions of the non-opaque tube; and c) determine a content characteristic of the non-opaque tube, based on imaged refractions of the patterned backdrop resulting from the respective degree of refraction associated with each said identified depicted region of the non-opaque tube.

2. The system of claim 1, wherein the content characteristic comprises an indication of a type of content present in the non-opaque tube.

3. The system of claim 2, wherein the indicated type of content is air.

4. The system of claim 2, wherein the indicated type of content is liquid.

5. The system of claim 1, wherein the PC is further configured to:

determine a volume corresponding with pixel dimensions of one of the identified depicted regions of the image.

6. The system of claim 1, wherein the PC is further configured to:

determine a volume of a gap between first and second identified depicted regions of the non-opaque tube, in accordance with a pixel distance between the first identified depicted region of the image and the second identified depicted region of the image.

7. The system of claim 1, wherein the PC is further configured to:

responsive to a degree of refraction associated with one of the identified depicted regions not matching a degree of refraction of an expected fluid:

raise an alert.

8. A processing circuitry-based method of determining presence of liquid or air in a non-opaque tube in a pharmaceutical preparation device, the method comprising:

a) receiving a camera image of the non-opaque tube, the non-opaque tube being positioned, from a camera perspective, in front of a patterned backdrop separate from and outside of the non-opaque tube, and comprising a region of parallel diagonal lines extending in parallel along a direction diagonal to a longitudinal axis along which the non-opaque tube extends, the received camera image thereby depicting one or more depicted regions of the non-opaque tube, wherein each depicted region is associated with a respective degree of refraction of the patterned backdrop according with refraction apparent in the camera image of a respective depicted portion of the patterned backdrop behind said depicted region and wherein the one or more depicted regions include at least one bubble or air gap;

b) identifying, using image processing techniques, in the received camera image, one or more of the depicted regions of the non-opaque tube; and c) determining a content characteristic of the non-opaque tube, based on imaged refractions of the patterned backdrop resulting from the respective degree of refraction associated with each said identified depicted region of the non-opaque tube.

9. A computer-readable storage medium comprising instructions which, when executed by a computer, cause the computer to carry out the steps of claim 8.

10. The system of claim 1, the system additionally comprising:

the camera, being positionable to capture an image of the non-opaque tube; and the patterned backdrop, being positionable to appear behind the non-opaque tube in an image captured by the camera.

11. The system of claim 1, wherein each of the parallel diagonal lines is at angle of between 1-179 degrees relative to a main axis of the tube.

* * * * *